United States Patent
Kim et al.

(10) Patent No.: US 7,706,836 B2
(45) Date of Patent: Apr. 27, 2010

(54) METHOD AND SYSTEM FOR A RADIO DATA SYSTEM (RDS) DEMODULATOR FOR A SINGLE CHIP INTEGRATED BLUETOOTH AND FREQUENCY MODULATION (FM) TRANSCEIVER AND BASEBAND PROCESSOR

(75) Inventors: Hea Joung Kim, Irvine, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1144 days.

(21) Appl. No.: 11/287,075

(22) Filed: Nov. 22, 2005

(65) Prior Publication Data
US 2006/0270449 A1    Nov. 30, 2006

Related U.S. Application Data

(60) Provisional application No. 60/685,239, filed on May 26, 2005.

(51) Int. Cl.
*H04M 1/00* (2006.01)

(52) U.S. Cl. .................. 455/553.1; 455/113; 455/550.1

(58) Field of Classification Search .................. 455/77, 455/84, 88, 113, 550.1, 552.1, 553.1
See application file for complete search history.

(56) References Cited

U.S. PATENT DOCUMENTS

| 5,625,643 | A | * | 4/1997 | Kaku et al. | 375/222 |
| 6,052,569 | A | * | 4/2000 | Ehrhardt | 455/188.1 |
| 6,868,129 | B2 | * | 3/2005 | Li et al. | 375/324 |

* cited by examiner

*Primary Examiner*—Nhan Le
(74) *Attorney, Agent, or Firm*—McAndrews, Held & Malloy

(57) ABSTRACT

Aspects of a method and system for a radio data service (RDS) demodulator for a single chip integrated Bluetooth and frequency modulation (FM) transceiver and baseband processor are presented. Aspects of the system may include circuitry on a single chip that enables demodulation of an RDS signal, filtering of the RDS signal, and detection of binary bits in the filtered RDS signal. The filtered RDS signal may be generated by filtering the RDS signal based on a raised cosine filter, or a doublet filter. In general, the RDS signal may also be filtered by a filter that is a first, or greater derivative of a Gaussian filter in either the time or frequency domain. Aspects of the method may include demodulating the RDS signal, filtering the RDS signal, and detecting binary bits in the filtered RDS signal.

20 Claims, 22 Drawing Sheets

METHOD AND SYSTEM FOR A RADIO DATA SYSTEM (RDS) DEMODULATOR FOR A SINGLE CHIP INTEGRATED BLUETOOTH AND FREQUENCY MODULATION (FM) TRANSCEIVER AND BASEBAND PROCESSOR

CROSS-REFERENCE TO RELATED APPLICATIONS/INCORPORATION BY REFERENCE

The application makes reference to, claims priority to, and claims the benefit of U.S. Provisional Application Ser. No. 60/685,239 filed on May 26, 2005.

This application also makes reference to:
U.S. application Ser. No. 11/176,417 filed on Jul. 7, 2005;
U.S. application Ser. No. 11/286,555 filed on even date herewith;
U.S. application Ser. No. 11/287,120 filed on even date herewith;
U.S. application Ser. No. 11/286,950 filed on even date herewith;
U.S. application Ser. No. 11/287,181 filed on even date herewith;
U.S. application Ser. No. 11/286,947 filed on even date herewith;
U.S. application Ser. No. 11/287,034 filed on even date herewith;
U.S. application Ser. No. 11/287,044 filed on even date herewith; and
U.S. application Ser. No. 11/286,844 filed on even date herewith.

Each of the above stated applications is hereby incorporated herein by reference in its entirety.

FIELD OF THE INVENTION

Certain embodiments of the invention relate to Bluetooth and FM communication technologies. More specifically, certain embodiments of the invention relate to a method and system for a radio data system (RDS) demodulator for a single chip integrated Bluetooth and frequency modulation (FM) transceiver and baseband processor.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while freeing to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN transceivers.

Among the multiple audio communication technologies is the radio data system (RDS). RDS is a standard established by the European Broadcasting Union (EBU) for sending digital information via conventional FM radio broadcast signals. In the United States, the National Radio Systems Committee (NRSC) has approved the radio broadcast data system (RBDS) standard. The RDS and RDBS standards are substantially equivalent.

RDS may be utilized to communicate various types of data that may be displayed at an RDS-enabled FM receiver. For example, RDS data may include clock time information that may be utilized to synchronize a clock at the FM receiver. Program service information may include information that identifies a radio station that is currently being received at the FM receiver. Program service information may include the call letters of the radio station and/or station identity. Program type information may include information about the genre of the programming broadcast by the radio station, for example, music types such as classical, pop, or soft rock. Radio text information allows radio, stations to transmit free-form textual information, such as the title and/or artist of a song currently being broadcast.

RDS may also be utilized to transmit traffic information. The traffic management, channel (TMC) may be utilized to deliver traffic and travel information. Traffic and travel information may include information about alternate routes, warnings about traffic congestion, or estimates of travel times to reach destinations. RDS may also be utilized to communicate global positioning system (GPS) information to an RDS-enabled FM receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a radio data system (RDS) demodulator for a single chip integrated Bluetooth and frequency modulation (FM) transceiver and baseband processor, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a radio data system (RDS) demodulator for a single chip integrated Bluetooth and frequency modulation (FM) transceiver and baseband processor. The RDS demodulator may be utilized to retrieve binary information from an RDS signal. The RDS demodulator may include feedback circuitry that enables the RDS demodulator to perform frequency offset corrections and/or timing corrections to adapt to the frequency and/or timing requirements of a received FM signal.

Aspects of a system for radio data service (RDS) signal demodulation in a single chip integrated Bluetooth and FM transceiver may include circuitry on a single chip that enables demodulation of an RDS signal, filtering of the RDS signal, and detection of binary bits in the filtered RDS signal. The filtered RDS signal may be generated by filtering the RDS signal based on a raised cosine filter, a Gaussian filter, or a doublet filter. In general, the RDS signal may be filtered by a first, or greater, derivative of the Gaussian filter in either the time or frequency domain. The RDS signal may be high pass filtered if the filtered RDS signal is generated by filtering the RDS signal utilizing a raised cosine filter.

Figure 1A:
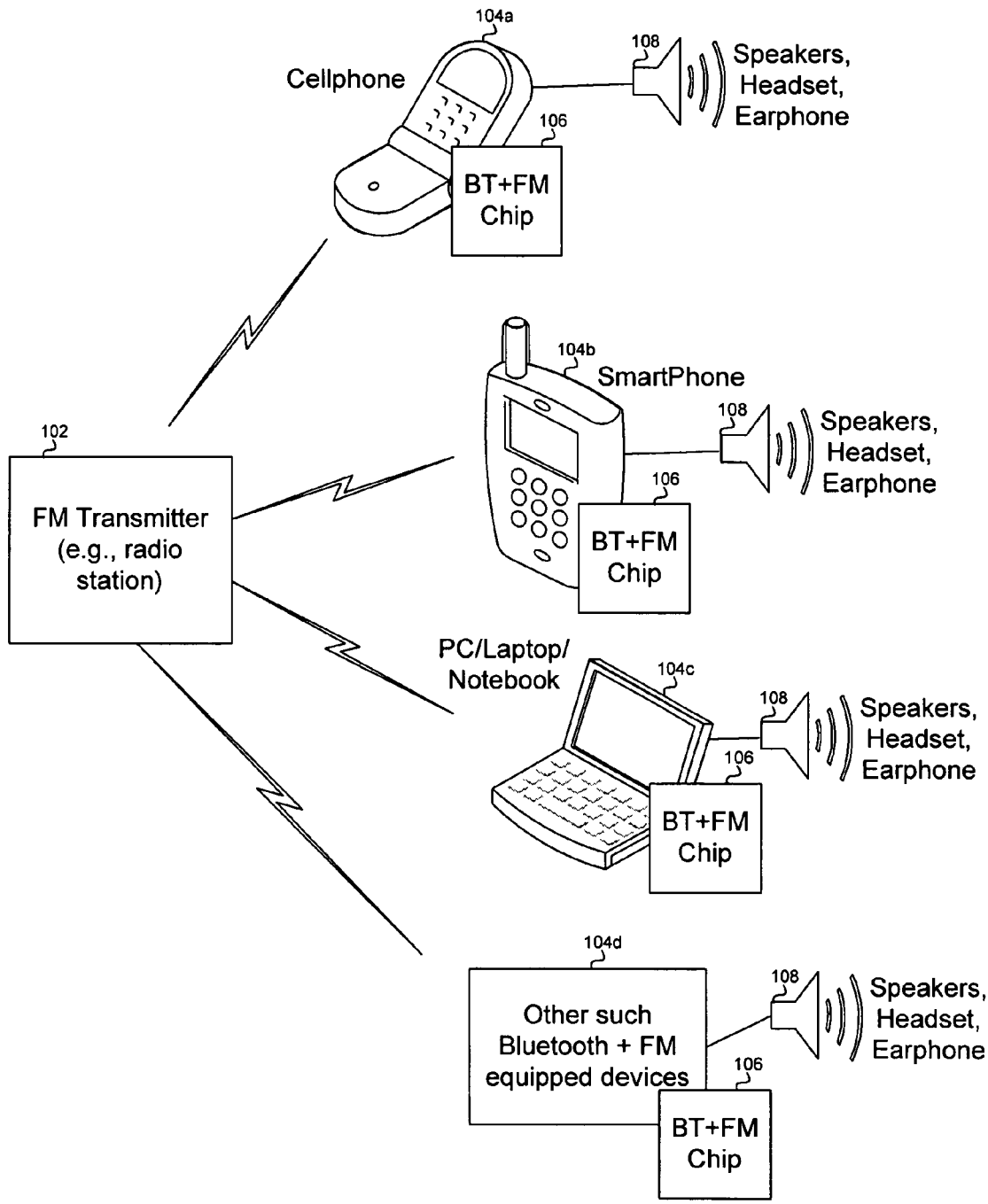
FIG. 1A is a block diagram of an exemplary FM transmitter that communicates with handlheld devices that utilize a single chip with integrated Bluetooth and FM radios, in accordance with an embodiment of the invention.

FIG. 1A is a block diagram of an exemplary FM transmitter that communicates with handheld devices that utilize a single chip with integrated Bluetooth and FM radios, in accordance with an embodiment of the invention. Referring to FIG. 1A, there is shown an FM transmitter 102, a cellular phone 104a, a smart phone 104b, a computer 104c, and an exemplary FM and Bluetooth-equipped device 104d. The FM transmitter 102 may be implemented as part of a radio station or other broadcasting device, for example. Each of the cellular phone 104a, the smart phone 104b, the computer 104c, and the exemplary FM and Bluetooth-equipped device 104d may comprise a single chip 106 with integrated Bluetooth and FM radios for supporting FM and Bluetooth data communications. The FM transmitter 102 may enable communication of FM audio data to the devices shown in FIG. 1A by utilizing the single chip 106. Each of the devices in FIG. 1A may comprise and/or may be communicatively coupled to a listening device 108 such as a speaker, a headset, or an earphone, for example.

The cellular phone 104a may be enabled to receive an FM transmission signal from the FM transmitter 102. The user of the cellular phone 104a may then listen to the transmission via the listening device 108. The cellular phone 104a may comprise a "one-touch" programming feature that enables pulling up specifically desired broadcasts, like weather, sports, stock quotes, or news, for example. The smart phone 104b may be enabled to receive an FM transmission signal from the FM transmitter 102. The user of the smart phone 104b may then listen to the transmission via the listening device 108.

The computer 104c may be a desktop, laptop, notebook, tablet, and a PDA, for example. The computer 104c may be enabled to receive an FM transmission signal from the FM transmitter 102. The user of the computer 104c may then listen to the transmission via the listening device 108. The computer 104c may comprise software menus that configure listening options and enable quick access to favorite options, for example. In one embodiment of the invention, the computer 104c may utilize an atomic clock FM signal for precise timing applications, such as scientific applications, for example. While a cellular phone, a smart phone, computing devices, and other devices have been shown in FIG. 1A, the single chip 106 may be utilized in a plurality of other devices and/or systems that receive and use Bluetooth and/or FM signals. In one embodiment of the invention, the single chip Bluetooth and FM radio may be utilized in a system comprising a WLAN radio. U.S. application Ser. No. 11/286,844 discloses a method and system comprising a single chip Bluetooth and FM radio integrated with a wireless LAN radio.

Figure 1B:
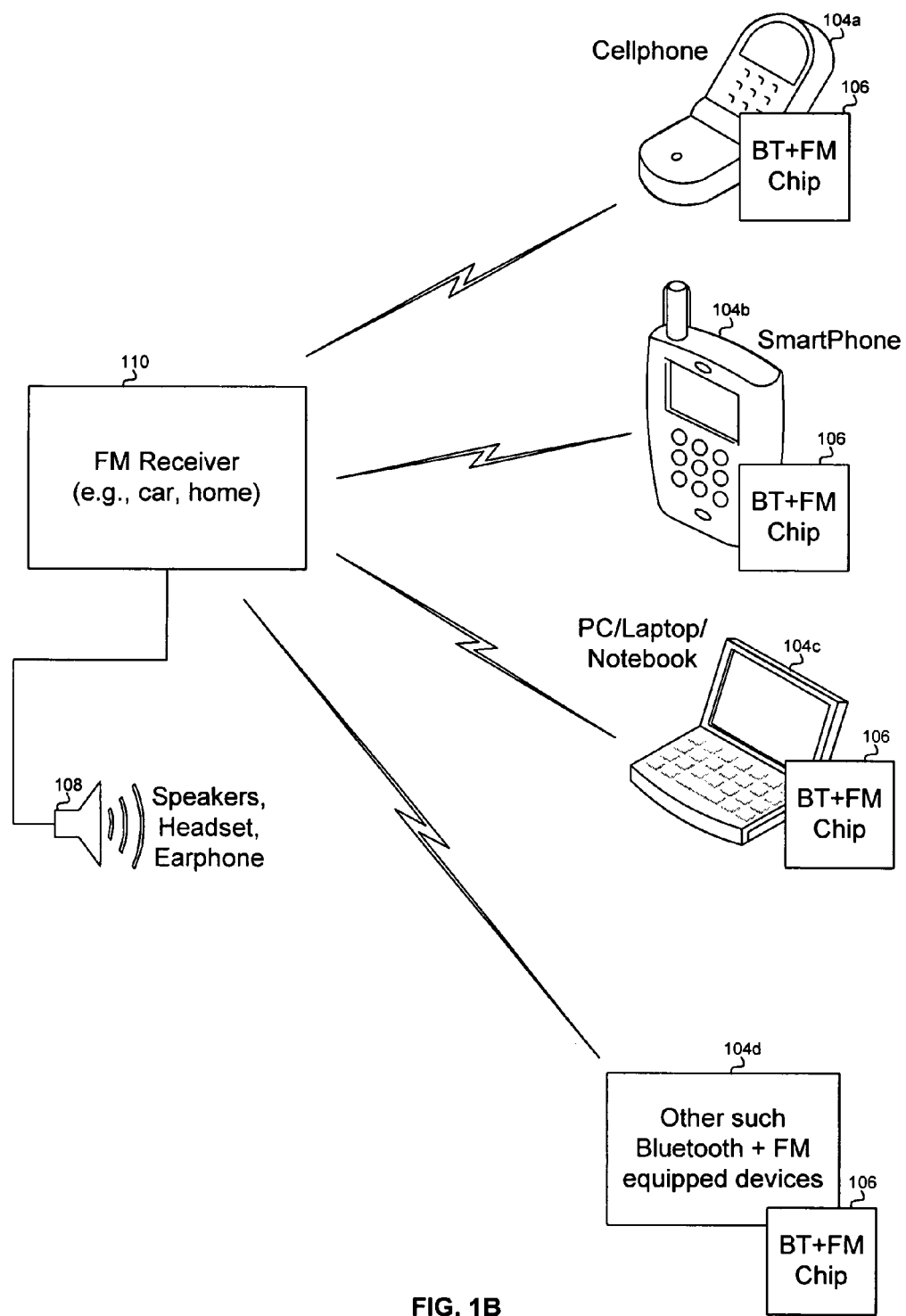
FIG. 1B is a block diagram of an exemplary FM receiver that communicates with handlheld devices that utilize a single chip with integrated Bluetooth and FM radios, in accordance with an embodiment of the invention.

FIG. 1B is a block diagram of an exemplary FM receiver that communicates with handheld devices that utilize a single chip with integrated Bluetooth and FM radios, in accordance with an embodiment of the invention. Referring to FIG. 1B, there is shown an FM receiver 110, the cellular phone 104a, the smart phone 104b, the computer 104c, and the exemplary FM and Bluetooth-equipped device 104d. In this regard, the FM receiver 110 may comprise and/or may be communicatively coupled to a listening device 108. A device equipped with the Bluetooth and FM transceivers, such as the single chip 106, may be able to broadcast its respective signal to a "deadband" of an FM receiver for use by the associated audio system. For example, a cellphone or a smart phone, such as the cellular phone 104a and the smart phone 104b, may transmit a telephone call for listening over the audio system of an automobile, via usage of a deadband area of the car's FM stereo system. One advantage may be the universal ability to use this feature with all automobiles equipped simply with an FM radio with few, if any, other external FM transmission devices or connections being required.

In another example, a computer, such as the computer 104c, may comprise an MP3 player or another digital music format player and may broadcast a signal to the deadband of an FM receiver in a home stereo system. The music on the computer may then be listened to on a standard FM receiver with few, if any, other external FM transmission devices or connections. While a cellular phone, a smart phone, and computing devices have been shown, a single chip that combines a Bluetooth and FM transceiver and/or receiver may be utilized in a plurality of other devices and/or systems that receive and use an FM signal.

Figure 1C:
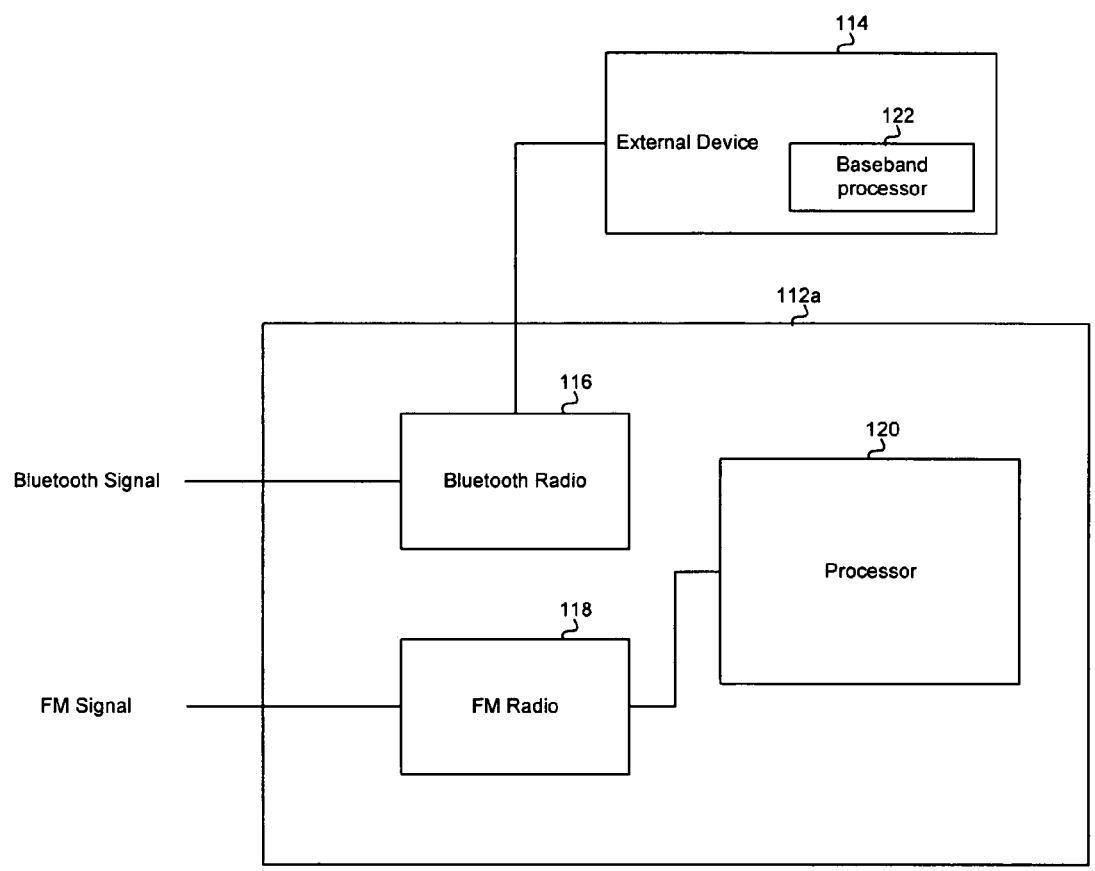
FIG. 1C is a block diagram of an exemplary single chip with integrated Bluetooth and FM radios that supports FM processing and an external device that supports Bluetooth processing, in accordance with an embodiment of the invention.

FIG. 1C is a block diagram of an exemplary single chip with integrated Bluetooth and FM radios that supports FM processing and an external device that supports Bluetooth processing, in accordance with an embodiment of the invention. Referring to FIG. 1C, there is shown a single chip 112a that supports Bluetooth and FM radio operations and an external device 114. The single chip 112a may comprise an integrated Bluetooth radio 116, an integrated FM radio 118, and an integrated processor 120. The Bluetooth radio 116 may comprise suitable logic, circuitry, and/or code that enable Bluetooth signal communication via the single chip 112a. In this regard, the Bluetooth radio 116 may support audio signals or communication. The FM radio may comprise suitable logic, circuitry, and/or code that enable FM signal communication via the single chip 112a.

The integrated processor 120 may comprise suitable logic, circuitry, and/or code that may enable processing of the FM data received by the FM radio 118. Moreover, the integrated processor 120 may enable processing of FM data to be transmitted by the FM radio 118 when the FM radio 118 comprises transmission capabilities. The external device 114 may comprise a baseband processor 122. The baseband processor 122 may comprise suitable logic, circuitry, and/or code that may enable processing of Bluetooth data received by the Bluetooth radio 116. Moreover, the baseband processor 122 may enable processing of Bluetooth data to be transmitted by the Bluetooth radio 116. In this regard, the Bluetooth radio 116 may communicate with the baseband processor 122 via the external device 114. The Bluetooth radio 116 may communicate with the integrated processor 120.

Figure 1D:
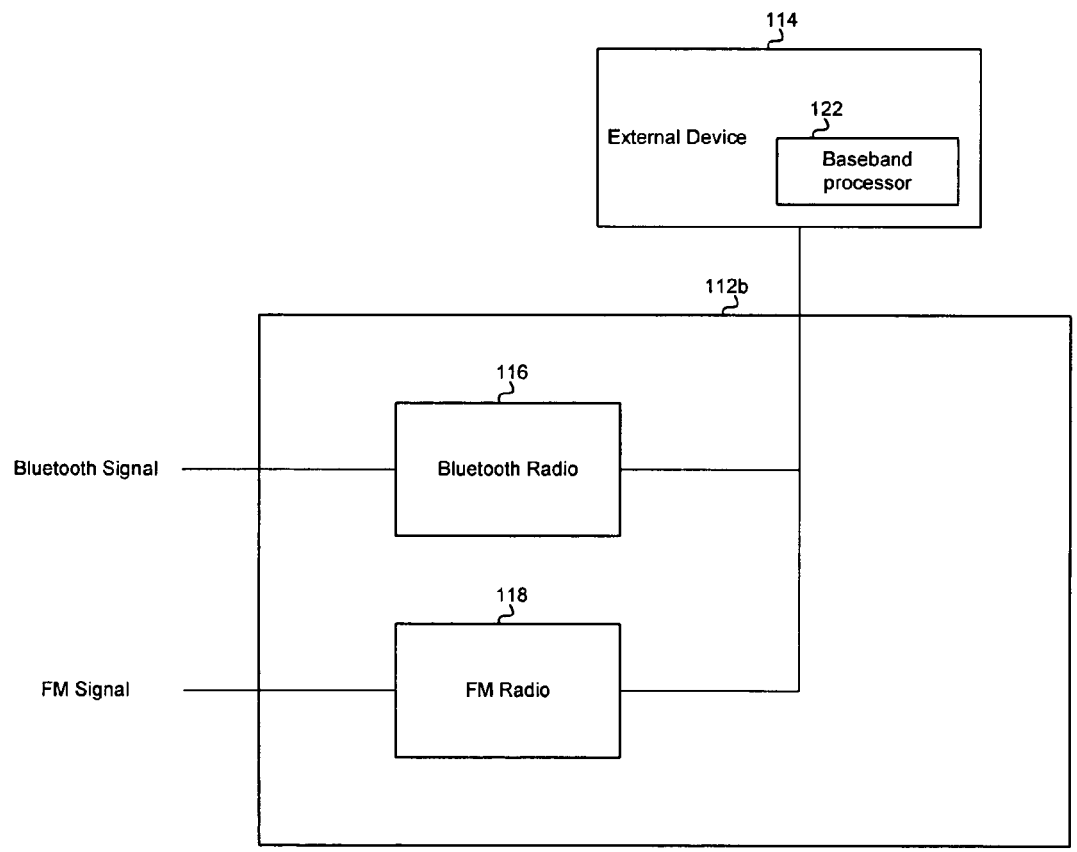
FIG. 1D is a block diagram of an exemplary single chip with integrated Bluetooth and FM radios and an external device that supports Bluetooth and FM processing, in accordance with an embodiment of the invention.

FIG. 1D is a block diagram of an exemplary single chip with integrated Bluetooth and FM radios and an external device that supports Bluetooth and FM processing, in accordance with an embodiment of the invention. Referring to FIG. 1D, there is shown a single chip 112b that supports Bluetooth and FM radio operations and an external device 114. The single chip 112b may comprise the Bluetooth radio 116 and the FM radio 118. The Bluetooth radio 116 and/or the FM radio 118 may be integrated into the single chip 112b. The external device 114 may comprise a baseband processor 122. The baseband processor 122 may comprise suitable logic, circuitry, and/or code that may enable processing of Bluetooth data received by the Bluetooth radio 116 and/or processing of Bluetooth data to be transmitted by the Bluetooth radio 116. In this regard, the Bluetooth radio 116 may communicate with the baseband processor 122 via the external device 114. Moreover, the baseband processor 122 may comprise suitable logic, circuitry, and/or code that may enable processing of the FM data received by the FM radio 118. The baseband processor 122 may enable processing FM data to be transmitted by the FM radio 118 when the FM radio 118 comprises transmission capabilities. In this regard, the FM radio 118 may communicate with the baseband processor 122 via the external device 114.

Figure 1E:
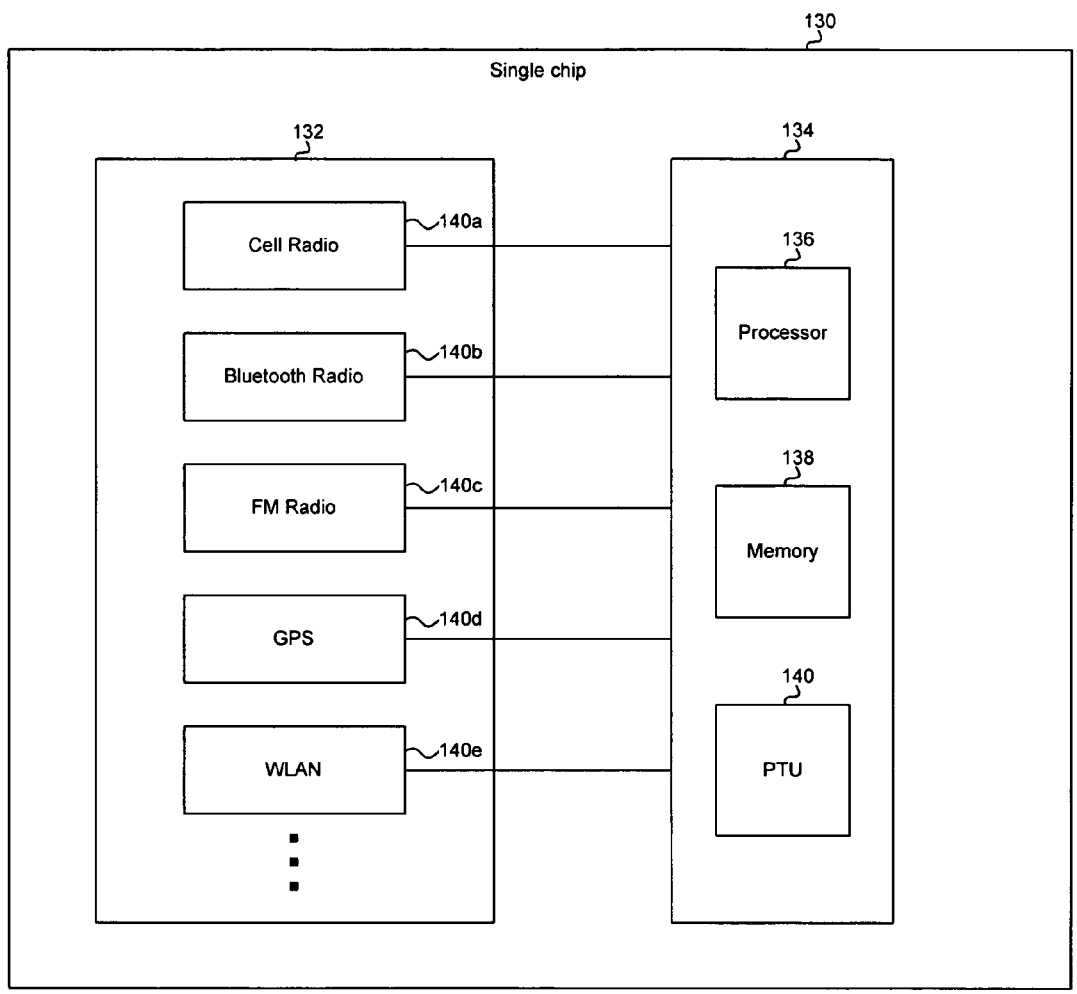
FIG. 1E is a block diagram of an exemplary single chip with multiple integrated radios that supports radio data processing, in accordance with an embodiment of the invention.

FIG. 1E is a block diagram of an exemplary single chip with multiple integrated radios that supports radio data processing, in accordance with an embodiment of the invention. Referring to FIG. 1E, there is shown a single chip 130 that may comprise a radio portion 132 and a processing portion 134. The radio portion 132 may comprise a plurality of integrated radios. For example, the radio portion 132 may comprise a cell radio 140a that supports cellular communications, a Bluetooth radio 140b that supports Bluetooth communications, an FM radio 140c that supports FM communications, a global positioning system (GPS) 140d that supports GPS communications, and/or a wireless local area network (WLAN) 140e that supports communications based on the IEEE 802.11 standards.

The processing portion 134 may comprise at least one processor 136, a memory 138, and a peripheral transport unit (PTU) 140. The processor 136 may comprise suitable logic, circuitry, and/or code that enable processing of data received from the radio portion 132. In this regard, each of the integrated radios may communicate with the processing portion 134. In some instances, the integrated radios may communicate with the processing portion 134 via a common bus, for example. The memory 138 may comprise suitable logic, circuitry, and/or code that enable storage of data that may be utilized by the processor 136. In this regard, the memory 138 may store at least a portion of the data received by at least one of the integrated radios in the radio portion 132. Moreover, the memory 138 may store at least a portion of the data that may be transmitted by at least one of the integrated radios in the radio portion 132. The PTU 140 may comprise suitable logic, circuitry, and/or code that may enable interfacing data in the single chip 130 with other devices that may be communicatively coupled to the single chip 130. In this regard, the PTU 140 may support analog and/or digital interfaces.

Figure 1F:
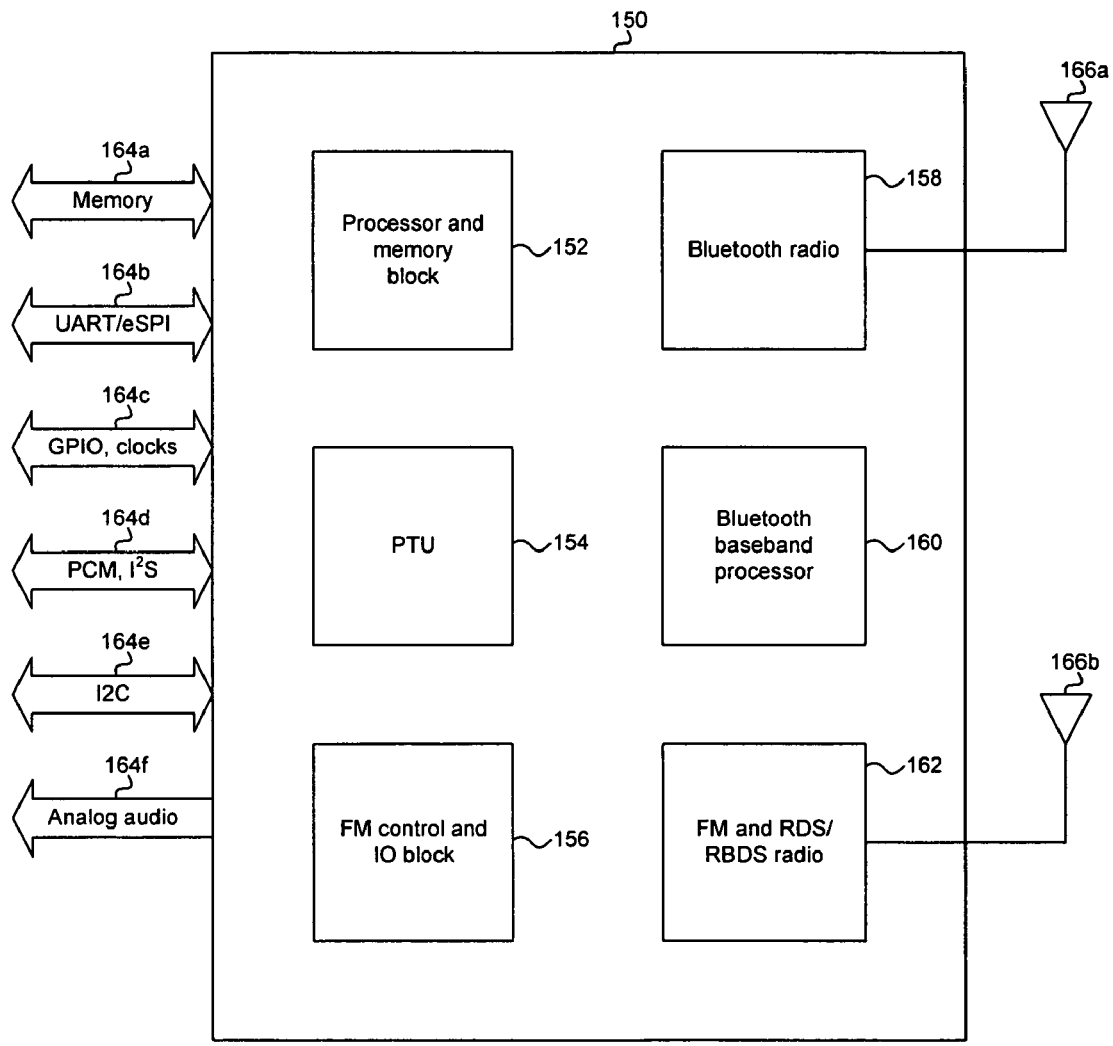
FIG. 1F is a block diagram of an exemplary single chip with integrated Bluetooth and FM radios that supports multiple interfaces, in accordance with an embodiment of the invention.

FIG. 1F is a block diagram of an exemplary single chip with integrated Bluetooth and FM radios that supports multiple interfaces, in accordance with an embodiment of the invention. Referring to FIG. 1F, there is shown a single chip 150 that supports Bluetooth and FM radio communications.

The single chip 150 may comprise a processor and memory block 152, a PTU 154, an FM control and input-output (IO) block 156, a Bluetooth radio 158, a Bluetooth baseband processor 160, and an FM and radio data system (RDS) and radio broadcast data system (RDBS) radio 162. A first antenna or antenna system 166a may be communicatively coupled to the Bluetooth radio 158. A second antenna or antenna system 166b may be communicatively coupled to the FM and RDS/RBDS radio 162.

The processor and memory block 152 may comprise suitable logic, circuitry, and/or code that may enable control, management, data processing operations, and/or data storage operations, for example. The PTU 154 may comprise suitable logic, circuitry, and/or code that may enable interfacing the single chip 150 with external devices. The FM control and IO block 156 may comprise suitable logic, circuitry, and/or code that may enable control of at least a portion of the FM and RDS/RBDS radio 162. The Bluetooth radio 158 may comprise suitable logic, circuitry, and/or code that may enable Bluetooth communications via the first antenna 166a. The FM and RDS/RBDS radio 162 may comprise suitable logic, circuitry, and/or code that may enable FM, RDS, and/or RBDS data communication via the second antenna 166b. The Bluetooth baseband processor 160 may comprise suitable logic, circuitry, and/or code that may enable processing of baseband data received from the Bluetooth radio 158 or baseband data to be transmitted by the Bluetooth radio 158.

The PTU 154 may support a plurality of interfaces. For example, the PTU 154 may support an external memory interface 164a, a universal asynchronous receiver transmitter (UART) and/or enhanced serial peripheral interface (eSPI) interface 164b, a general purpose input/output (GPIO) and/or clocks interface 164c, a pulse-code modulation (PCM) and/or an inter-IC sound ($I^2S$) interface 164d, an inter-integrated circuit (I2C) bus interface 164e, and/or an audio interface 164f.

Figure 1G:
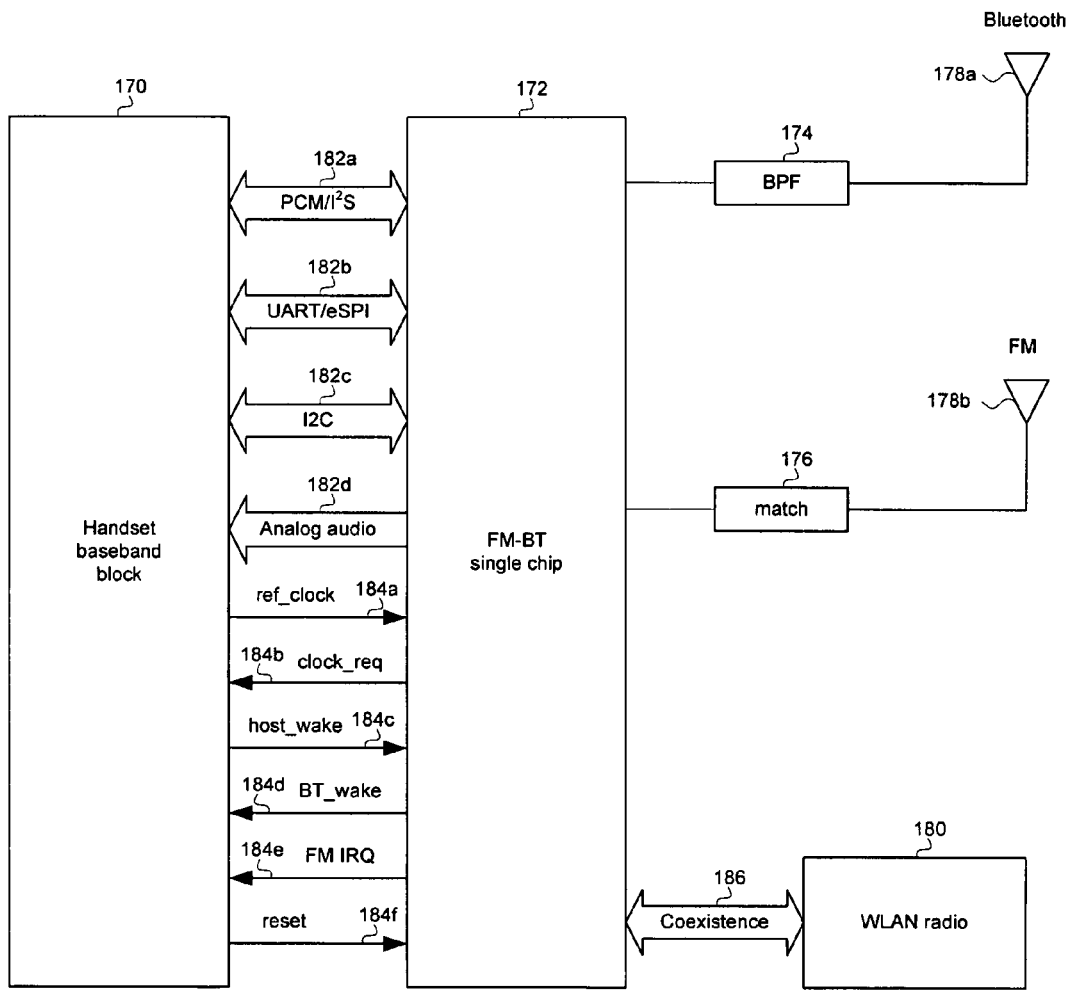
FIG. 1G is a block diagram of an exemplary single chip with integrated Bluetooth and FM radios that supports interfacing with a handset baseband device and a coexistent wireless LAN (WLAN) radio, in accordance with an embodiment of the invention.

FIG. 1G is a block diagram of an exemplary single chip with integrated Bluetooth and FM radios that supports interfacing with a handset baseband device and a coexistent wireless LAN (WLAN) radio, in accordance with an embodiment of the invention. Referring to FIG. 1G, there is shown a single chip 172, a handset baseband block 170, a band pass filter 174, a first antenna or antenna system 178a, a matching circuit 176, a second antenna or antenna filter 178b, and a WLAN radio 180. The single chip 172 may be substantially similar to the single chip 150. In this instance, the single chip 172 may comprise suitable logic, circuitry, and/or code that may enable coexistent operation with the WLAN radio 180 via the coexistence interface 186.

The single chip 172 may communicate Bluetooth data via the BPF 174 and the first antenna 178a. The single chip 172 may also communicate FM data via the matching circuit 176 and the second antenna 178b. The single chip 172 may coordinate Bluetooth data communication in the presence of WLAN channels by communicating with the WLAN radio 180 via the coexistence interface 186.

The single chip 172 may transfer data to the handset baseband block 170 via at least one interface, such as a PCM/I2S interface 182a, a UART/eSPI interface 182b, a I2C interface 182c, and/or and analog audio interface 182d. The single chip 172 and the handset baseband block 170 may also communicate via at least one control signal. For example, the handset baseband block 170 may generate a clock signal, ref_clock, 184a, a wake signal, host_wake 184c, and/or a reset signal 184f that may be transferred to the single chip 172. Similarly, the single chip 172 may generate a clock request signal, clock_req, 184b, a Bluetooth wake signal, BT_wake, 184d, and/or an FM interrupt request signal, FM IRQ, 184e that may be transferred to the handset baseband block 170. The handset baseband block 170 may comprise suitable logic, circuitry, and/or code that may enable processing of at least a portion of the data received from the single chip 172 and/or data to be transferred to the single chip 172. In this regard, the handset baseband block 170 may transfer data to the single chip 172 via at least one interface.

Figure 2A:
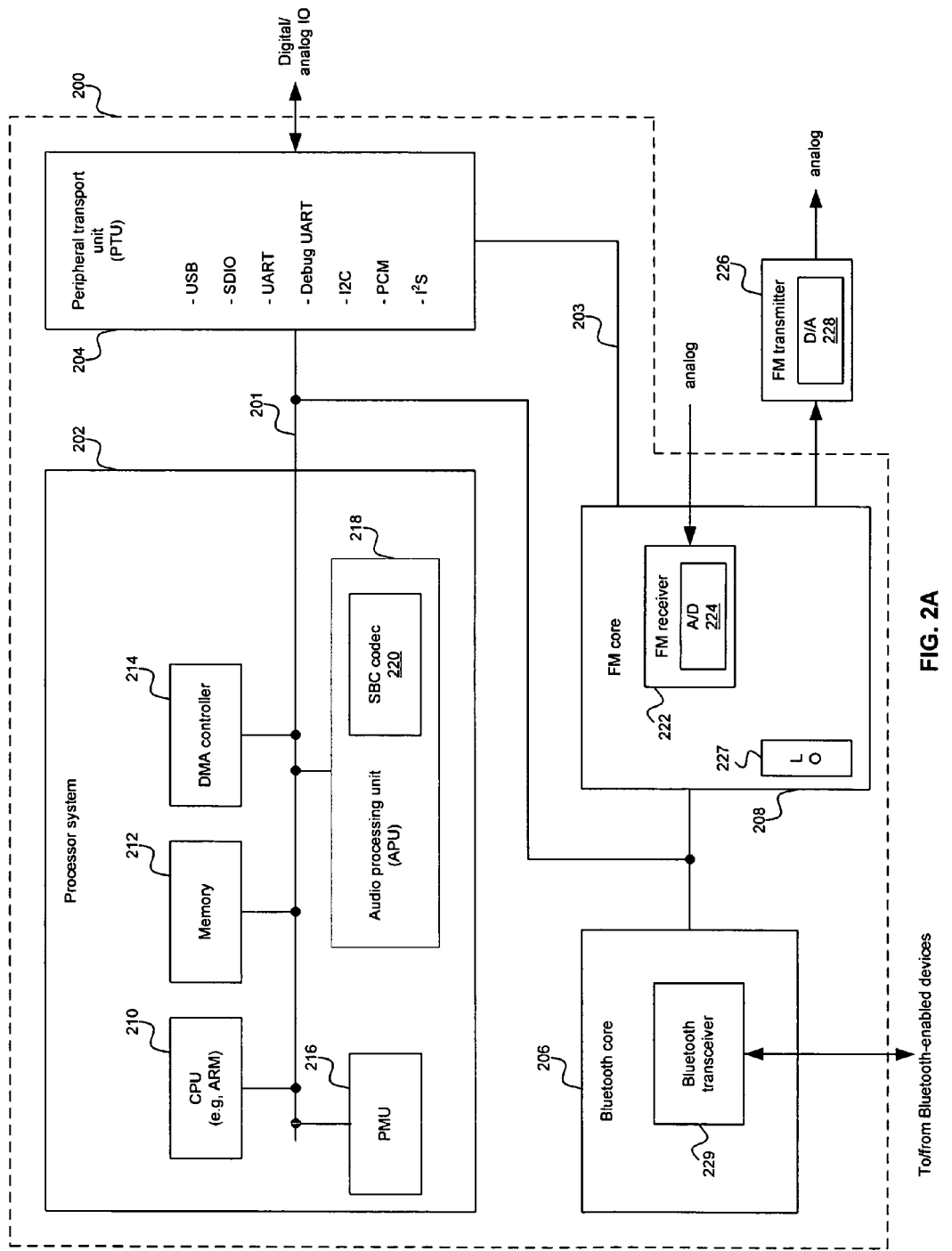
FIG. 2A is a block diagram of an exemplary single chip that supports Bluetooth and FM operations with an external FM transmitter, in accordance with an embodiment of the invention.

FIG. 2A is a block diagram of an exemplary single chip that supports Bluetooth and FM operations with an external FM transmitter, in accordance with an embodiment of the invention. Referring to FIG. 2A, there is shown a single chip 200 that may comprise a processor system 202, a peripheral transport unit (PTU) 204, a Bluetooth core 206, a frequency modulation (FM) core 208, and a common bus 201. An FM transmitter 226 may be an external device to the single chip 200 and may be communicatively coupled to the single chip 200 via the FM core 208, for example. The FM transmitter 226 may be a separate integrated circuit (IC), for example.

The processor system 202 may comprise a central processing unit (CPU) 210, a memory 212, a direct memory access (DMA) controller 214, a power management unit (PMU) 216, and an audio processing unit (APU) 218. The APU 218 may comprise a subband coding (SBC) codec 220. At least a portion of the components of the processor system 202 may be communicatively coupled via the common bus 201.

The CPU 210 may comprise suitable logic, circuitry, and/or code that may enable control and/or management operations in the single chip 200. In this regard, the CPU 210 may communicate control and/or management operations to the Bluetooth core 206, the FM core 208, and/or the PTU 204 via a set of register locations specified in a memory map. Moreover, the CPU 210 may be utilized to process data received by the single chip 200 and/or to process data to be transmitted by the single chip 200. The CPU 210 may enable processing of data received via the Bluetooth core 206, via the FM core 208, and/or via the PTU 204. For example, the CPU 210 may enable processing of A2DP data and may then transfer the processed A2DP data to other components of the single chip 200 via the common bus 201. In this regard, the CPU may utilize the SBC codec 220 in the APU 218 to encode and/or decode A2DP data, for example. The CPU 210 may enable processing of data to be transmitted via Bluetooth core 206, via the FM core 208, and/or via the PTU 204. The CPU 210 may be, for example, an ARM processor or another embedded processor core that may be utilized in the implementation of system-on-chip (SOC) architectures.

The CPU 210 may time multiplex Bluetooth data processing operations and FM data processing operations. In this regard, the CPU 210 may perform each operation by utilizing a native clock, that is, Bluetooth data processing based on a Bluetooth clock and FM data processing based on an FM clock. The Bluetooth clock and the FM clock may be distinct and may not interact. The CPU 210 may gate the FM clock and the Bluetooth clock and may select the appropriate clock in accordance with the time multiplexing scheduling or arrangement. When he CPU 210 switches between Bluetooth operations and FM operations, at least certain states associated with the Bluetooth operations or with the FM operations may be retained until the CPU 210 switches back.

For example, in the case where the Bluetooth function is not active and is not expected to be active for some time, the CPU 210 may run on a clock derived from the FM core 208. This may eliminate the need to bring in a separate high-speed clock when one is already available in the FM core 208. In the case where the Bluetooth core 206 may be active, for example when the Bluetooth is in a power-saving mode that requires it to be active periodically, the processor may chose to use a clock derived separately from the FM core 208. The clock may be derived directly from a crystal or oscillator input to the Bluetooth core 206, or from a phase locked loop (PLL) in the Bluetooth core 206. While this clocking scheme may provide certain flexibility in the processing operations performed by the CPU 210 in the single chip 200, other clocking schemes may also be implemented.

The CPU 210 may also enable configuration of data routes to and/or from the FM core 208. For example, the CPU 210 may configure the FM core 208 so that data may be routed via an I²S interface or a PCM interface in the PTU 204 to the analog ports communicatively coupled to the PTU 204.

The CPU 210 may enable tuning, such as flexible tuning, and/or searching operations in Bluetooth and/or FM communication by controlling at least a portion of the Bluetooth core 206 and/or the FM core 208. For example, the CPU 210 may generate at least one signal that tunes the FM core 208 to a certain frequency to determine whether there is a station at that frequency. When a station is found, the CPU 210 may configure a path for the audio signal to be processed in the single chip 200. When a station is not found, the CPU 210 may generate at least one additional signal that tunes the FM core 208 to a different frequency to determine whether a station may be found at the new frequency.

Searching algorithms may enable the FM core 208 to scan up or down in frequency from a presently tuned channel and stop on the next channel with received signal strength indicator (RSSI) above a threshold. The search algorithm may be able to distinguish image channels. The choice of the IF frequency during search is such that an image channel may have a nominal frequency error of 50 kHz, which may be used to distinguish the image channel from the "on" channel. The search algorithm may also be able to determine if a high side or a low side injection provides better receive performance, thereby allowing for a signal quality metric to be developed for this purpose. One possibility to be investigated is monitoring the high frequency RSSI relative to the total RSSI. The IF may be chosen so that with the timing accuracy that a receiver may be enabled to provide, the image channels may comprise a frequency error that is sufficiently large to differentiate the image channels from the on channel.

The CPU 210 may enable a host controller interface (HCI) in Bluetooth. In this regard, the HCI provides a command interface to the baseband controller and link manager, and access to hardware status and control registers. The HCI may provide a method of accessing the Bluetooth baseband capabilities that may be supported by the CPU 210.

The memory 212 may comprise suitable logic, circuitry, and/or code that may enable data storage. In this regard, the memory 212 may be utilized to store data that may be utilized by the processor system 202 to control and/or manage the operations of the single chip 200. The memory 212 may also be utilized to store data received by the single chip 200 via the PTU 204 and/or via the FM core 208. Similarly, the memory 212 may be utilized to store data to be transmitted by the single chip 200 via the PTU 204 and/or via the FM core 208. The DMA controller 214 may comprise suitable logic, circuitry, and/or code that may enable transfer of data directly to and from the memory 212 via the common bus 201 without involving the operations of the CPU 210.

The PTU 204 may comprise suitable logic, circuitry, and/or code that may enable communication to and from the single chip 200 via a plurality of communication interfaces. In some instances, the PTU 204 may be implemented outside the single chip 200, for example. The PTU 204 may support analog and/or digital communication with at least one port. For example, the PTU 204 may support at least one universal series bus (USB) interface that may be utilized for Bluetooth data communication, at least one secure digital input/output (SDIO) interface that may also be utilized for Bluetooth data communication, at least one universal asynchronous receiver transmitter (UART) interface that may also be utilized for Bluetooth data communication, and at least one I2C bus interface that may be utilized for FM data communication. The PTU 204 may also support at least one PCM interface that may be utilized for Bluetooth data communication and/or FM data communication, for example.

The PTU 204 may also support at least one inter-IC sound (I²S) interface, for example. The I²S interface may be utilized to send high fidelity FM digital signals to the CPU 210 for processing, for example. In this regard, the I²S interface in the PTU 204 may receive data from the FM core 208 via a bus 203, for example. Moreover, the I²S interface may be utilized to transfer high fidelity audio in Bluetooth. For example, in the A2DP specification there is support for wideband speech that utilizes 16 kHz of audio. In this regard, the I²S interface may be utilized for Bluetooth high fidelity data communication and/or FM high fidelity data communication. The I²S interface may be a bidirectional interface and may be utilized to support bidirectional communication between the PTU 204 and the FM core 208 via the bus 203.

The Bluetooth core 206 may comprise suitable logic, circuitry, and/or code that may enable reception and/or transmission of Bluetooth data. The Bluetooth core 206 may comprise a Bluetooth transceiver 229 that may perform reception and/or transmission of Bluetooth data. In this regard, the Bluetooth core 206 may support amplification, filtering, modulation, and/or demodulation operations, for example. The Bluetooth core 206 may enable data to be transferred from and/or to the processor system 202, the PTU 204, and/or the FM core 208 via the common bus 201, for example.

The FM core 208 may comprise suitable logic, circuitry, and/or code that may enable reception and/or transmission of FM data. The FM core 208 may comprise an FM receiver 222 and a local oscillator (LO) 227. The FM receiver 222 may comprise an analog-to-digital (A/D) converter 224. The FM receiver 222 may support amplification, filtering, and/or demodulation operations, for example. The LO 227 may be utilized to generate a reference signal that may be utilized by the FM core 208 for performing analog and/or digital operations. The FM core 206 may enable data to be transferred from and/or to the processor system 202, the PTU 204, and/or the Bluetooth core 206 via the common bus 201, for example. Moreover, the FM core 208 may receive analog FM data via the FM receiver 222. The A/D converter 224 in the FM receiver 222 may be utilized to convert the analog FM data to digital FM data to enable processing by the FM core 208. The FM core 208 may also enable the transfer of digital FM data to the FM transmitter 226. The FM transmitter 226 may comprise a digital-to-analog (D/A) converter 228 that may be utilized to convert digital FM data to analog FM data to enable transmission by the FM transmitter 226. Data received by the FM core 208 may be routed out of the FM core 208 in digital format via the common bus 201 and/or in analog format via the bus 203 to the I²S interface in the PTU 204, for example.

The FM core 208 may enable radio transmission and/or reception at various frequencies, such as, 400 MHz, 900 MHz, 2.4 GHz and/or 5.8 GHz, for example. The FM core 208 may also support operations at the standard FM band comprising a range of about 76 MHz to 108 MHz, for example.

The FM core 208 may also enable reception of RDS data and/or RBDS data for in-vehicle radio receivers. In this regard, the FM core 208 may enable filtering, amplification, and/or demodulation of the received RDS/RBDS data. The RDS/RBDS data may comprise, for example, a traffic message channel (TMC) that provides traffic information that may be communicated and/or displayed to an in-vehicle user.

Digital circuitry within the FM core 208 may be operated based on a clock signal generated by dividing down a signal generated by the LO 227. The LO 227 may be programmable in accordance with the various channels that may be received by the FM core 208. The divide ratio may be varied in order to maintain the digital clock signal close to a nominal value.

The RDS/RBDS data may be buffered in the memory 212 in the processor system 202. The RDS/RBDS data may be transferred to the memory 212 via the I2C interface when the CPU 210 is in a sleep or stand-by mode. For example, the FM core 208 may post RDS data into a buffer in the memory 212 until a certain level is reached and an interrupt is generated to wake up the CPU 210 to process the RDS/RBDS data. When the CPU 210 is not in a sleep mode, the RDS data may be transferred to the memory 212 via the common bus 201, for example.

Moreover, the RDS/RBDS data received via the FM core 208 may be transferred to any of the ports communicatively coupled to the PTU 204 via the HCI scheme supported by the single chip 200, for example. The RDS/RBDS data may also be transferred to the Bluetooth core 206 for communication to Bluetooth-enabled devices.

In one exemplary embodiment of the invention, the single chip 200 may receive FM audio data via the FM core 208 and may transfer the received data to the Bluetooth core 206 via the common bus 201. The Bluetooth core 206 may transfer the data to the processor system 202 to be processed. In this regard, the SBC codec 220 in the APU 218 may perform SBC coding or other A2DP compliant audio coding for transportation of the FM data over a Bluetooth A2DP link. The processor system 202 may also enable performing continuous variable slope delta (CVSD) modulation, log pulse code modulation (Log PCM), and/or other Bluetooth compliant voice coding for transportation of FM data on Bluetooth synchronous connection-oriented (SCO) or extended SCO (eSCO) links. The Bluetooth-encoded FM audio data may be transferred to the Bluetooth core 206, from which it may be communicated to another device that supports the Bluetooth protocol. The CPU 210 may be utilized to control and/or manage the various data transfers and/or data processing operations in the single chip 200 to support the transmission of FM audio data via the Bluetooth protocol.

Moreover, when Bluetooth data is received, such as A2DP, SCO, eSCO, and/or MP3, for example, the Bluetooth core 206 may transfer the received data to the processor system 202 via the common bus 201. At the processor system 202, the SBC codec 220 may decode the Bluetooth data and may transfer the decoded data to the FM core 208 via the common bus 201. The FM core 208 may transfer the data to the FM transmitter 226 for communication to an FM receiver in another device.

In another exemplary embodiment of the invention, the single chip 200 may operate in a plurality of modes. For example, the single chip 200 may operate in one of an FM-only mode, a Bluetooth-only mode, and an FM-Bluetooth mode. For the FM-only mode, the single chip 200 may operate with a lower power active state than in the Bluetooth-only mode or the FM-Bluetooth mode because FM operation in certain devices may have a limited source of power. In this regard, during the FM-only mode, at least a portion of the operation of the Bluetooth core 206 may be disabled to reduce the amount of power used by the single chip 200. Moreover, at least a portion of the processor system 202, such as the CPU 210, for example, may operate based on a divided down clock from a phase locked-loop (PLL) in the FM core 208. In this regard, the PLL in the FM core 208 may utilize the LO 227, for example.

Moreover, because the code necessary to perform certain FM operations, such as tuning and/or searching, for example, may only require the execution of a few instructions in between time intervals of, for example, 10 ms, the CPU 210 may be placed on a stand-by or sleep mode to reduce power consumption until the next set of instructions is to be executed. In this regard, each set of instructions in the FM operations code may be referred to as a fragment or atomic sequence. The fragments may be selected or partitioned in a very structured manner to optimize the power consumption of the single chip 200 during FM-only mode operation. In some instances, fragmentation may also be implemented in the FM-Bluetooth mode to enable the CPU 210 to provide more processing power to Bluetooth operations when the FM core 208 is carrying out tuning and/or searching operations, for example.

Figure 2B:
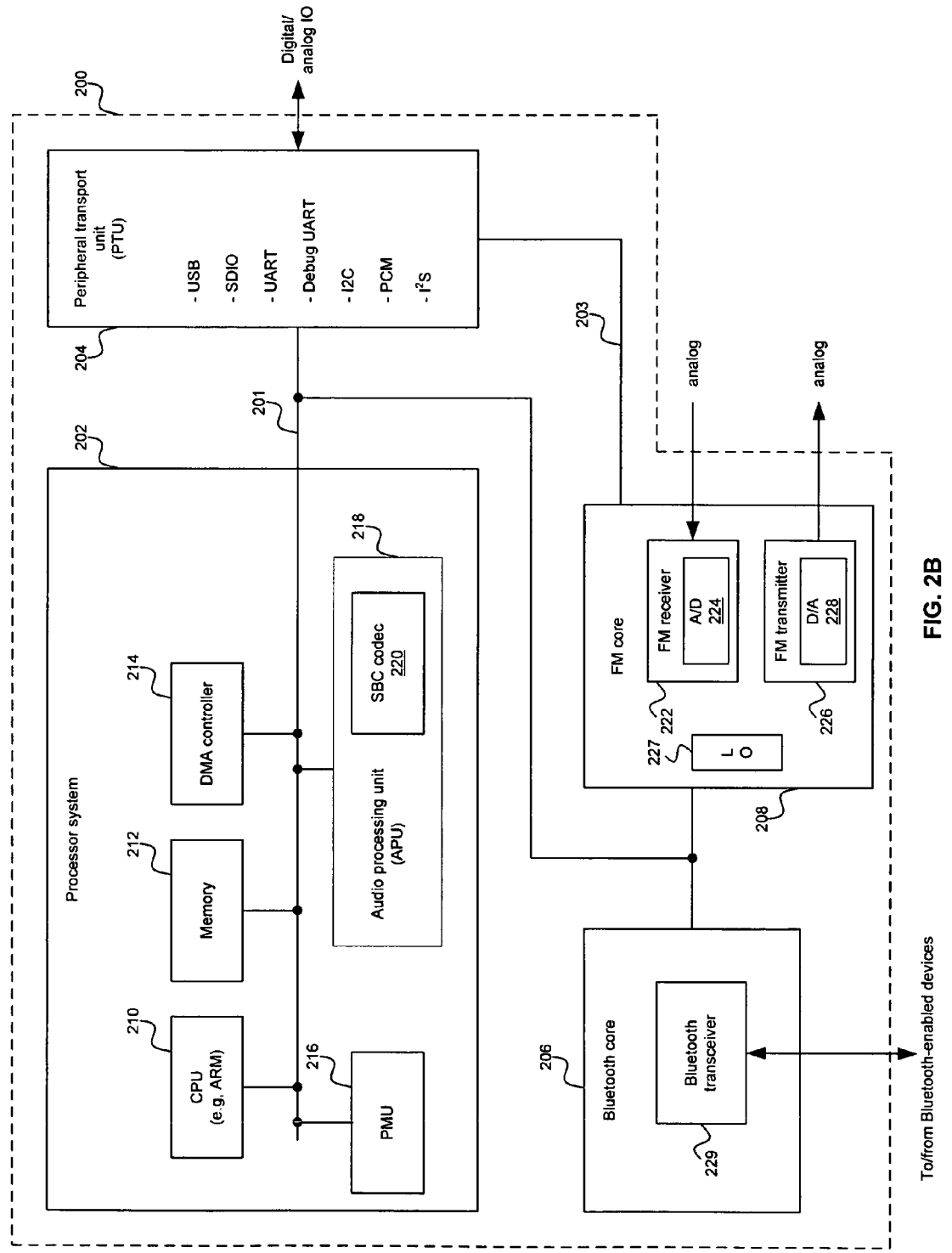
FIG. 2B is a block diagram of an exemplary single chip that supports Bluetooth and FM operations with an integrated FM transmitter, in accordance with an embodiment of the invention.

FIG. 2B is a block diagram of an exemplary single chip that supports Bluetooth and FM operations with an integrated FM transmitter, in accordance with an embodiment of the invention. Referring to FIG. 2B, there is shown the single chip 200 as described in FIG. 2A with the FM transmitter 226 integrated into the FM core 208. In this regard, the FM core 208 may support FM reception and/or transmission of FM data. The FM transmitter 226 may utilize signals generated based on the reference signal generated by the LO 227. The FM core 208 may enable transmission of data received via the PTU 204 and/or the Bluetooth core 206, for example. The exemplary implementation of the single chip 200 as described in FIG. 2B may support FM reception and/or transmission and Bluetooth reception and/or transmission.

Figure 2C:
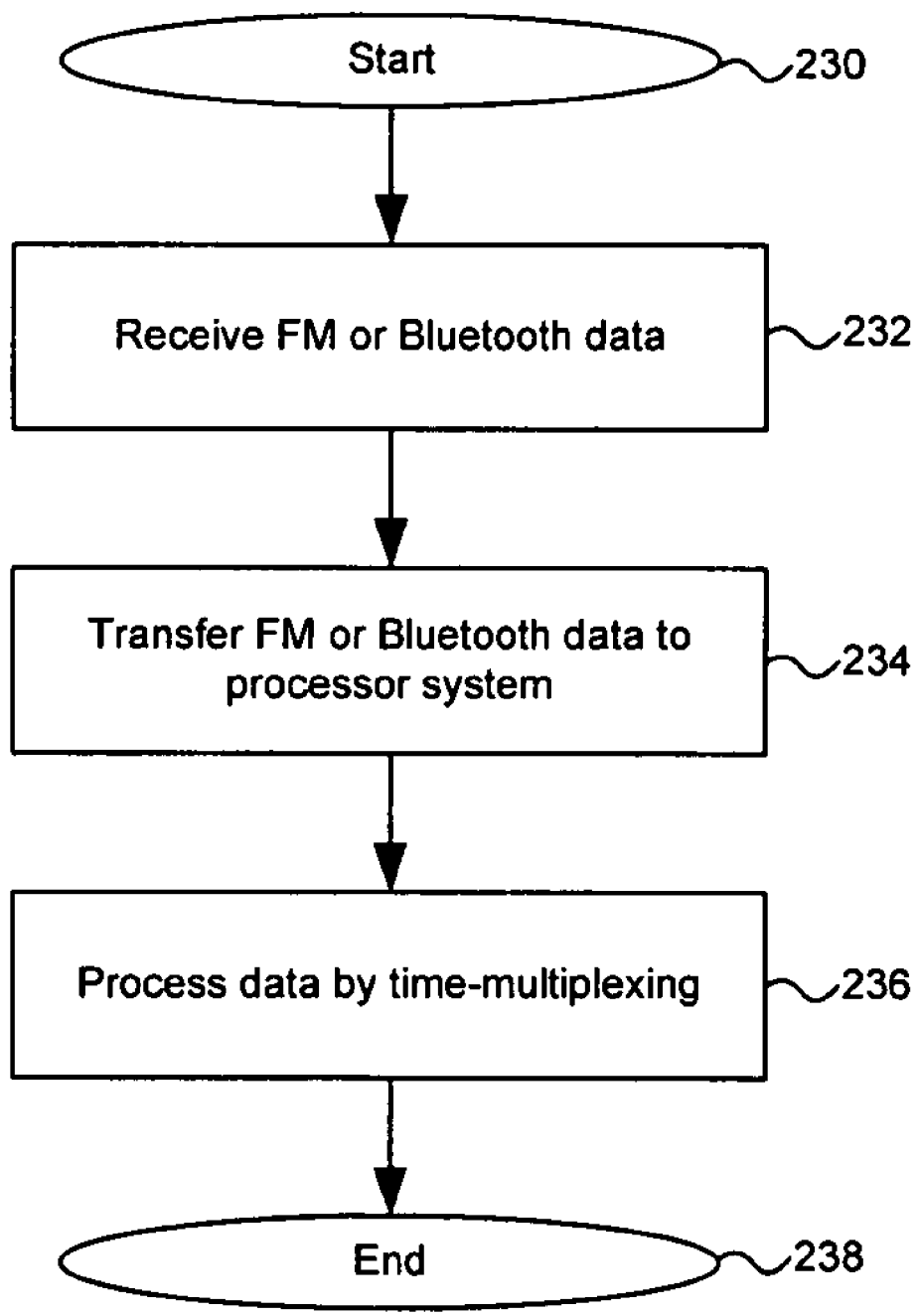
FIG. 2C is a flow diagram that illustrates exemplary steps for processing received data in a single chip with integrated Bluetooth and FM radios, in accordance with an embodiment of the invention.

FIG. 2C is a flow diagram that illustrates exemplary steps for processing received data in a single chip with integrated Bluetooth and FM radios, in accordance with an embodiment of the invention. Referring to FIGS. 2A and 2C, in step 232, after start step 230, the FM core 208 or the Bluetooth core 206 may receive data. For example, the FM core 208 may receive FM data via the FM receiver 222 and the Bluetooth core 206 may receive Bluetooth data via the Bluetooth transceiver 229. In step 234, the received data may be transferred to the processor system 202 via the common bus 201 for processing. The received data may be transferred to the memory 212 by the DMA controller 214, for example. In some instances, the processor system 202 may then transfer the data to the PUT 204, for example. The received data may be transferred to the processing system 202 in accordance with the time multiplexing schedule or arrangement provided by the processing system 202. In step 236, the processor system 202 may time multiplex the processing of FM data and the processing of Bluetooth data. For example, when Bluetooth data is being processed, FM data may not be transferred to the processing system 202 or may be transferred and stored in the memory 212 until FM processing is enabled. When the processing system 202 has completed processing the Bluetooth data, the FM data may be transferred to the processing system 202 for FM processing. Similarly, when FM data is being processed, Bluetooth data may not be transferred to the processing system 202 or may be transferred and stored in the memory 212 until Bluetooth processing is enabled. When the processing system 202 has completed processing the FM data, the Bluetooth data may be transferred to the processing system 202 for Bluetooth processing. After step 236, the process may proceed to end step 238.

Figure 2D:
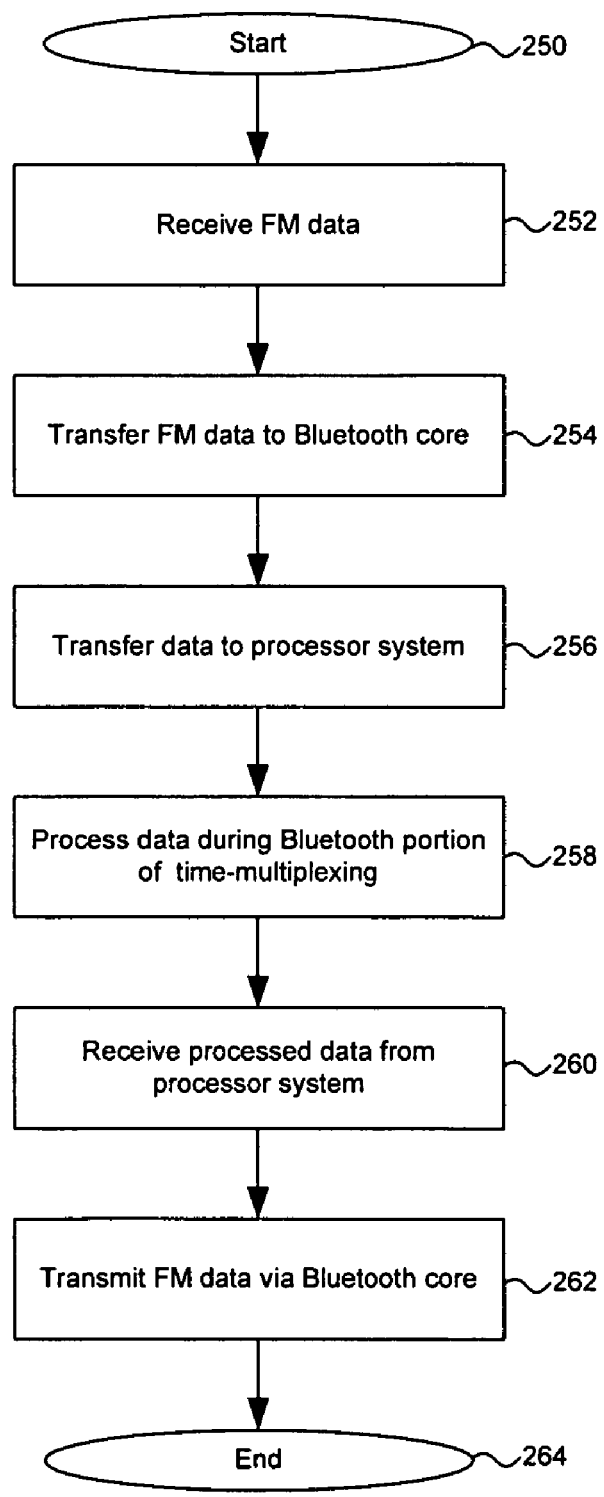
FIG. 2D is a flow diagram that illustrates exemplary steps for processing FM data via the Bluetooth core in a single chip with integrated Bluetooth and FM radios, in accordance with an embodiment of the invention.

FIG. 2D is a flow diagram that illustrates exemplary steps for processing FM data via the Bluetooth core in a single chip with integrated Bluetooth and FM radios, in accordance with an embodiment of the invention. Referring to FIGS. 2A and 2D, after start step 250, in step 252, the FM core 208 may receive FM data via the FM receiver 222. In step 254, the FM core 208 may transfer the FM data to the Bluetooth core 206 via the common bus 201. In step 256, the Bluetooth core 206 may transfer the FM data received from the FM core 208 to the processor system 202 via the common bus 201. In step 258, the processor system 202 may perform Bluetooth processing operations, such as encoding for example, to the FM data received from the Bluetooth core 206. In step 260, the Bluetooth core 206 may receive the processed FM data. In step 262, the Bluetooth core 206 may transfer the processed FM data to at least one Bluetooth-enable device via the Bluetooth transceiver 229.

An illustrative instance where the exemplary steps described in FIG. 2D may occur is when a handset is enabled to receive FM data and the handset may be enabled to operate with a Bluetooth headset. In this regard, the handset may receive the FM audio signal via the FM core 208 and may process the received signal for transfer to the headset via the Bluetooth core 206.

Figure 2E:
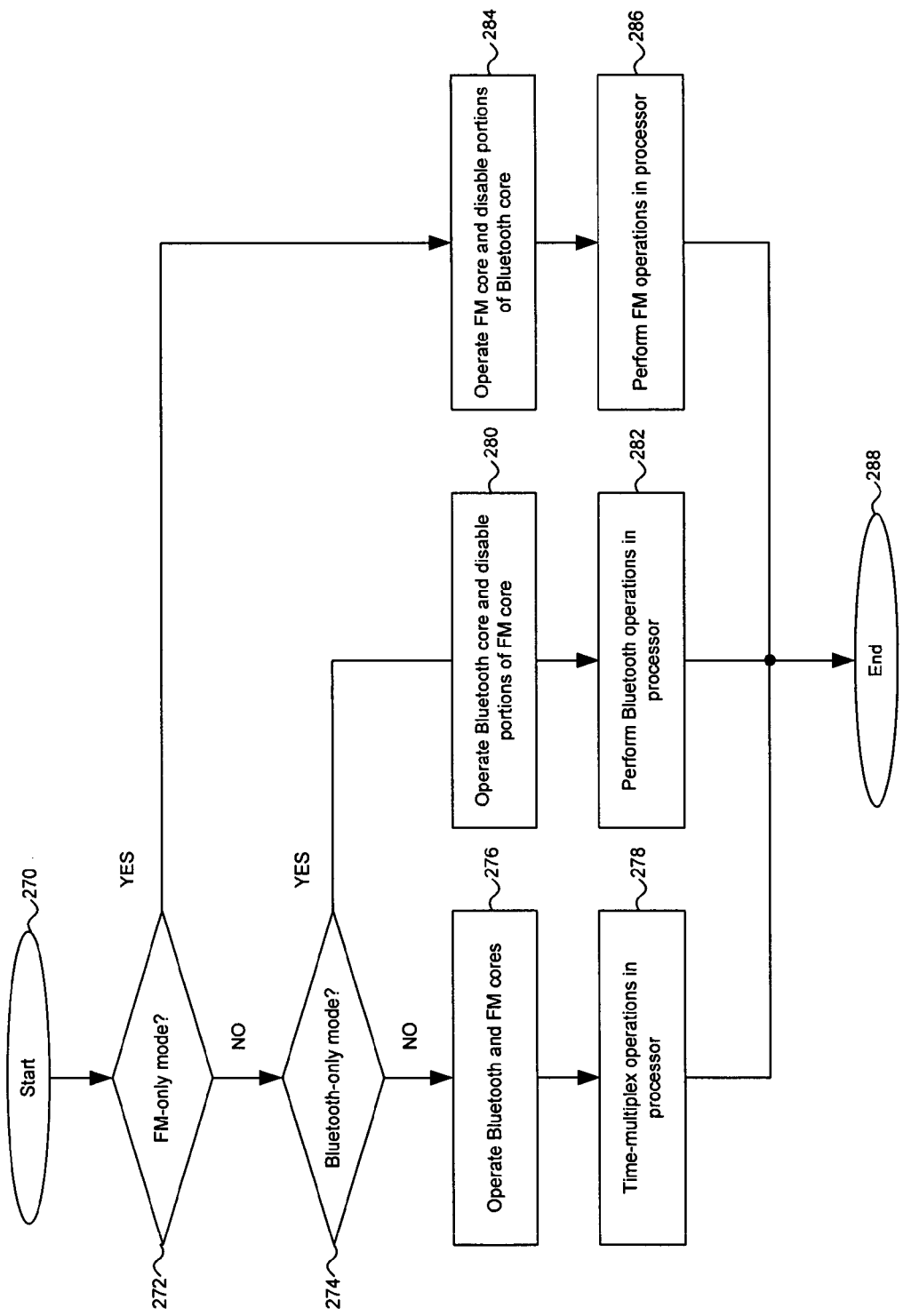
FIG. 2E is a flow diagram that illustrates exemplary steps for configuring a single chip with integrated Bluetooth and FM radios based on the mode of operation, in accordance with an embodiment of the invention.

FIG. 2E is a flow diagram that illustrates exemplary steps for configuring a single chip with integrated Bluetooth and FM radios based on the mode of operation, in accordance with an embodiment of the invention. Referring to FIG. 2E, after start step 270, in step 272, when a single chip with integrated Bluetooth and FM radios operates in an FM-only mode, the process may proceed to step 284. In step 284, the FM core 208 may be configured for operation and at least portions of the Bluetooth core 206 may be disabled. In step 286, FM data received and/or FM data to be transmitted may be processed in the processor system 202 without need for time multiplexing.

Returning to step 272, when the single chip is not operating in the FM-only mode, the process may proceed to step 274. In step 274, when the single chip is operating in the Bluetooth-only mode, the process may proceed to step 280. In step 280, the Bluetooth core 206 may be configured for operation and at least portions of the FM core 208 may be disabled. In step 282, Bluetooth data received and/or Bluetooth data to be transmitted may be processed in the processor system 202 without need for time multiplexing.

Returning to step 274, when the single chip is not operating in the Bluetooth-only mode, the process may proceed to step 276. In step 276, the Bluetooth core 206 and the FM core 208 may be configured for operation. In step 278, Bluetooth data and/or FM data may be processed in the processor system 202 in accordance with time multiplexing schedule or arrangement.

Figure 3:
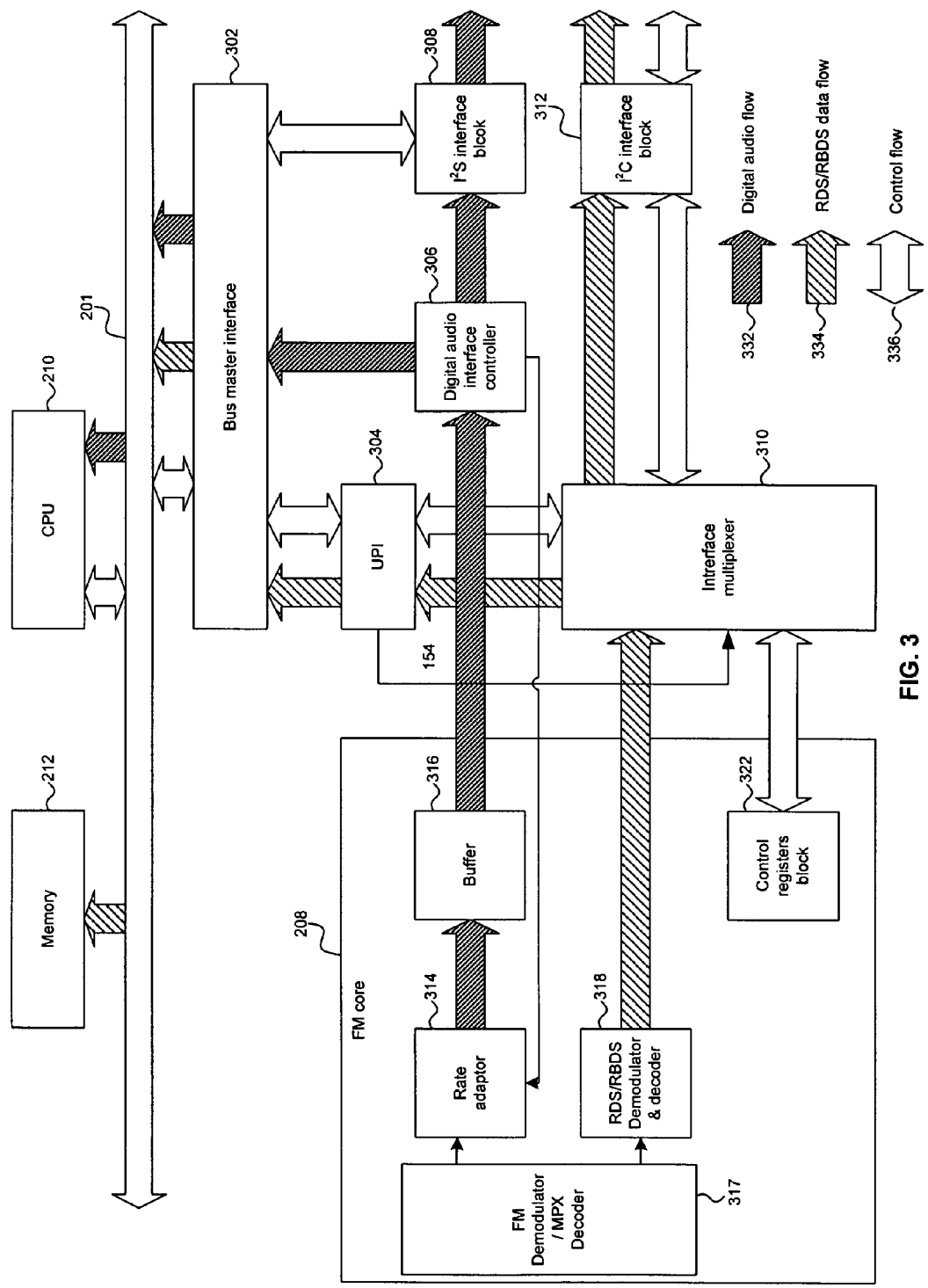
FIG. 3 is a block diagram of an exemplary FM core and PTU for processing RDS and digital audio data, in accordance with an embodiment of the invention.

FIG. 3 is a block diagram of an exemplary FM core and PTU for processing RDS and digital audio data, in accordance with an embodiment of the invention. Referring to FIG. 3, there is shown a more detailed portion of the single chip 200 described in FIGS. 2A-2B. The portion of the single chip 200 shown in FIG. 3 comprises the FM core 208, the memory 212, the CPU 210, and the common bus 201. Also shown are portions of the PTU 204 comprising an interface multiplexer 310, a universal peripheral interface (UPI) 304, a bus master interface 302, a digital audio interface controller 306, an I²S interface block 308, and an I²C interface block 312. The FM core 208 may comprise an FM/MPX demodulator and decoder 317, a rate adaptor 314, a buffer 316, an RDS/RBDS decoder 318, and a control registers block 322. Narrowly spaced hashed arrows as illustrated by the flow arrow 332 show the flow of digital audio data. Broadly spaced hashed arrows as illustrated by the flow arrow 334 show the flow of RDS/RBDS data. Clear or blank arrows, as illustrated by the dual flow arrow 336, show the flow of control data.

The FM/MPX demodulator and decoder 317 may comprise suitable logic, circuitry, and/or code that may enable processing of FM and/or FM MPX stereo audio, for example. The FM/MPX demodulator and decoder 317 may demodulate and/or decode audio signals that may be transferred to the rate adaptor 314. The FM/MPX demodulator and decoder 317 may demodulate and/or decode signals that may be transferred to the RDS/RBDS demodulator and decoder 318. The rate adaptor 314 may comprise suitable logic, circuitry, and/or code that may enable controlling the rate of the FM data received from the FM/MPX demodulator and decoder 317. The rate adaptor 314 may adapt the output sampling rate of the audio paths to the sampling clock of the host device or the rate of a remote device when a digital audio interface is used to transport the FM data. An initial rough estimate of the adaptation fractional change may be made and the estimate may then refined by monitoring the ratio of reading and writing rates and/or by monitoring the level of the audio samples in the output buffer. The rate may be adjusted in a feedback manner such that the level of the output buffer is maintained. The rate adaptor 314 may receive a strobe or pull signal from the digital audio interface controller 306, for example. Audio FM data from the rate adaptor 314 may be transferred to the buffer 316.

The buffer 316 may comprise suitable logic, circuitry, and/or code that may enable storage of digital audio data. The buffer 316 may receive a strobe or pull signal from the digital audio interface controller 306, for example. The buffer 316 may transfer digital audio data to the digital audio interface controller 306. The digital audio interface controller 306 may comprise suitable logic, circuitry, and/or code that may enable the transfer of digital audio data to the bus master interface 302 and/or the I²S interface block 308. The I²S interface 308 may comprise suitable logic, circuitry, and/or code that may enable transfer of the digital audio data to at least one device communicatively coupled to the single chip. The I²S interface 308 may communicate control data with the bus master interface 302.

The RDS/RBDS demodulator and decoder 318 may comprise suitable logic, circuitry, and/or code that may enable processing of RDS/RBDS data received from the FM/MPX demodulator and decoder 317. The RDS/RBDS demodulator and decoder 318 may provide further demodulation and/or decoding to data received from the FM/MPX demodulator and decoder 317. The output of the RDS/RBDS decoder 318 may be transferred to the interface multiplexer 310. The interface multiplexer 310 may comprise suitable logic, circuitry, and/or code that may enable the transfer of RDS/RBDS data to the UPI 304 and/or the I2C interface block 312. In this regard, the UPI 304 may generate a signal that indicates to the interface multiplexer 310 the interface to select. The I2C interface 312 may comprise suitable logic, circuitry, and/or code that may enable transfer of the RDS/RBDS data to at least one device communicatively coupled to the single chip. The I2C interface 312 may also communicate control data between external devices to the single chip and the interface multiplexer 310. In this regard, the interface multiplexer 310 may communicate control data between the I2C interface 312, the UPI 304, and/or the control registers block 322 in the FM core 208. The control registers block 322 may comprise suitable logic, circuitry, and/or code that may enable the storage of register information that may be utilized to control and/or configure the operation of at least portions of the FM core 208.

The UPI 304 may comprise suitable logic, circuitry, and/or code that may enable the transfer of digital audio data to the bus master interface 302 from the interface multiplexer 310. The UPI 304 may also enable the communication of control data between the bus master interface 302 and the interface multiplexer 310. The bus master interface 302 may comprise suitable logic, circuitry, and/or code that may enable communication of control data, digital audio data, and/or RDS/RBDS data between the portions of the PTU 204 shown in FIG. 3 and the common bus 201. The bus master interface 302 may transfer digital audio data and/or RDS/RBDS data to the common bus 201. The RDS/RBDS data may be transferred to the memory 212, for example. In some instances, the RDS/RBDS data may be transferred to the memory 212 when the CPU 210 is in a stand-by or sleep mode. The bus master interface 302 may push RDS/RBDS data into a buffer in the memory 212 or may pull RDS/RBDS data from a buffer in the memory 212, for example. The digital audio data may be transferred to the CPU 210 for processing, for example. The CPU 210 may generate and/or receive control data that may be communicated with the PTU 204 and/or the FM core 208 via the common bus 201.

In one embodiment of the invention, the single chip with integrated FM and Bluetooth radios may implement a search algorithm that collects and stores data during scanning of the FM band. The single chip may determine whether there is music or speech in a detected channel. Moreover, the single chip may enable searching and finding 10 of the strongest stations, for example, and may rank them.

In another embodiment of the invention, the single chip with integrated FM and Bluetooth radios may implement a search algorithm where the searches may be done based on specific criteria such as type of station or type of music, for example. The single chip may characterize each of the stations found based on the search.

In another embodiment of the invention, the single chip with integrated FM and Bluetooth radios may enable turning OFF a voltage regulator to the FM radio when in BT-only mode or turning OFF voltage regulators to the Bluetooth radio and the FM radio when both Bluetooth and FM are not being used, for example. In another embodiment of the invention, the single chip with integrated FM and Bluetooth radios may enable extending the battery life in a handheld device by requiring that the single chip does not consume power until configured by the host. Moreover, there may not be a load on the system until the chip is powered down and/or the chip may not draw any current when powered down.

In another embodiment of the invention, the single chip with integrated FM and Bluetooth radios may enable a digital filter that may combine de-emphasis, base, and/or treble. The digital filter may have a programmable audio bandwidth, for example. In another embodiment of the invention, the single chip with integrated FM and Bluetooth radios may enable a power amplifier dynamical bypass for Class 1 systems. In another embodiment of the invention, the single chip with integrated FM and Bluetooth radios may enable an antenna with an adjustable center frequency.

In another embodiment of the invention, the single chip with integrated FM and Bluetooth radios may enable Bluetooth coexistence with WLAN. In this regard, coexistence may be supported when radiation of energy is not greater than a certain threshold. In some cases, such threshold may be 90 dBm, for example. The coexistence may be implemented to minimize the amount of energy that flows from the Bluetooth radio to the WLAN radio, for example. In this regard, the single chip may utilize a guilty-by-association technique in order to identify WLAN interfering channels in the vicinity of a Bluetooth device. Because WLAN channels may deteriorate very rapidly in the presence of Bluetooth communication, the guilty-by-association technique may enable a fast determination or identification of which adaptive frequency hopping (AFH) channels to block in order to limit the effect of Bluetooth communication on WLAN channels. Channel measurement statistics may be collected in 'bins' of N MHz each where N=2, 3, 4, etc and condemn the entire bin as bad if any K of the channels in the bin was measured as bad. An example may be when K=1. Condemnation of the entire bin as bad, that is, guilty-by-association, may increase both the reliability as well, as speed with a WLAN channels of contiguous 20~22 MHz that may be blocked out in the AFH channel map. The use of techniques that modify the AFH channel map need not be limited to instances when a Bluetooth radio and an FM radio are integrated into a single chip. Modification of the AFH channel map may be applied to instances when Bluetooth applications are in coexistent operation with WLAN applications.

The WLAN interfering channels may be detected by utilizing channel measurement statistics such as received signal strength indicator (RSSI) energy measurements and/or packet error rate (PER) measurements. PER measurements may include missing a packet due to synchronization errors, cyclic redundancy check (CRC) errors in decoding the header, and/or CRC errors in decoding the payload, for example. These measurements may be performed during the Bluetooth frame duration (1.25 ms) on the current Bluetooth channel or on channels different from the current Bluetooth channel.

In another embodiment of the invention, the single chip with integrated FM and Bluetooth radios may enable a low noise FM phase-locked loop (PLL) that may minimize the 32 KHz clock noise and/or the large phase noise that may occur. In this regard, the FM PLL may utilize a narrow loop bandwidth, for example.

In another embodiment of the invention, the single chip with integrated FM and Bluetooth radios may disable at least a portion of the analog circuitry in the FM radio and/or the Bluetooth radio when performing digital processing. Disabling analog circuitry provides a reduction in the amount of power consumed by the single chip.

In another embodiment of the invention, the single chip with integrated FM and Bluetooth radios may be enabled to support high definition (HD) radio systems. In HD radio systems, the broadcasters may utilize digital signals to transmit existing analog AM and FM signals. In this regard, the analog AM and FM signals may be transmitted simultaneously and the use of digital channels may result in higher quality audio and a more robust signal. In first generation HD radio systems, services such as Main Program Service or Station Reference Service may be provided. Other services that may be supported for HD radio in the single chip may be requests for audio presentation of news, weather, entertainment, and/or stocks, for example. Additional services may comprise navigational products or applications, such as traffic information, for example, time-shifted listening, mobile commerce and advertisement, Internet-based broadcasts, and/or reading services for the visually impaired.

Figure 4:
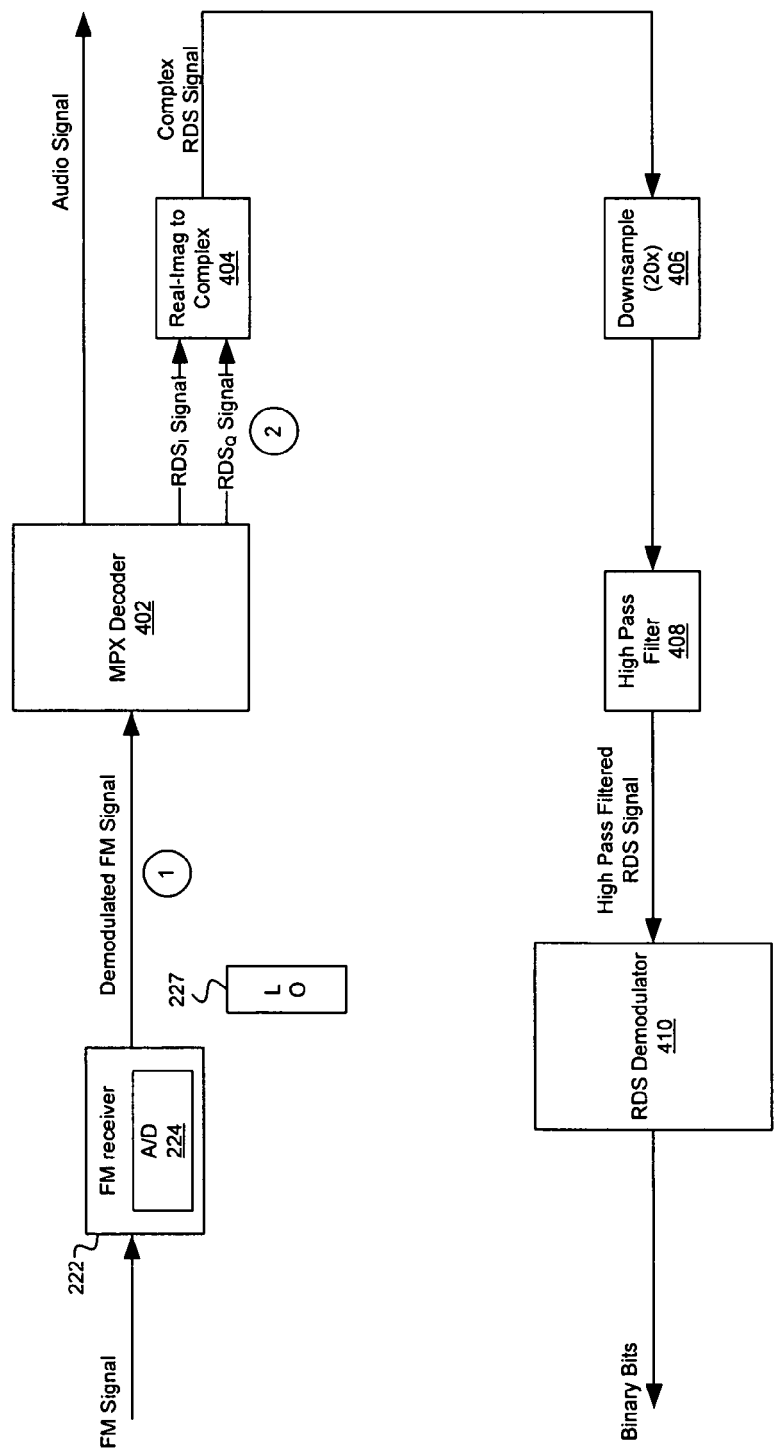
FIG. 4 is a block diagram of an exemplary system for RDS subcarrier demodulation with high pass filtering of the RDS signal in a single chip integrated Bluetooth and FM transceiver, in accordance with an embodiment of the invention.

FIG. 4 is a block diagram of an exemplary system for RDS subcarrier demodulation with high pass filtering of the RDS signal in a single chip integrated Bluetooth and FM transceiver, in accordance with an embodiment of the invention. Referring to FIG. 4, there is shown an FM core 208, a multiplex (MPX) decoder 402, a conversion block 404, a downsample converter block 406, a high pass filter block 408, and an RDS demodulator 410. The FM core 208 may comprise an FM receiver 222 and a local oscillator (LO) 227. The FM receiver 222 may comprise an analog to digital converter 224.

FM core 208 may comprise suitable circuitry, logic, and/or code that may enable FM demodulation on a received FM signal. The result may be an AM signal, for example. MPX decoder 402 may comprise suitable circuitry, logic, and/or code that may enable processing of a received signal that comprises audio information and/or data. The MPX decoder 402 may enable generation of an audio signal and a data signal. The data signal may comprise an RDS signal. The RDS signal may comprise an in-phase signal component, $RDS_I$, and a quadrature phase signal component, $RDS_Q$.

The conversion block 404 may comprise suitable logic, circuitry, and/or code that may enable generation of a complex signal representation of a real signal component and an imaginary signal component. The conversion block 404 may enable receiving of an in-phase signal component, $RDS_I$, and a quadrature phase signal component, $RDS_Q$. The in-phase signal component, $RDS_I$, may be associated with a real signal component. The quadrature phase signal component, $RDS_Q$, may be associated with an imaginary signal component. The conversion block 404 may construct a complex RDS signal according to the following equation, for example:

$$RDS_C = RDS_I + i \cdot RDS_Q \qquad \text{equation}[1]$$

where $RDS_C$ may represent a complex representation of the RDS signal, and i may represent the square root of the quantity −1.

The downsample converter block 406 may comprise suitable circuitry, logic, and/or code that may enable reducing a rate at which a signal is digitally sampled. For example, the downsample converter block 406 may receive a complex RDS signal that is digitally sampled every $1/T_{samp}$ seconds. The downsample converter block 406 may enable generation of a downsampled version of the complex RDS signal that is digitally sampled every $20/T_{samp}$ seconds, for example.

The high pass filter block 408 may comprise suitable circuitry, logic, and/or code that may be utilized to high pass filter a received signal. The high pass filter block 408 may generate a high pass filtered RDS signal after removing at least a portion of low frequency components from a received RDS signal, for example. The RDS demodulator 410 may comprise suitable circuitry, logic, and/or code that may be enable detection of binary bits that may be encoded in an RDS signal.

Figure 5:
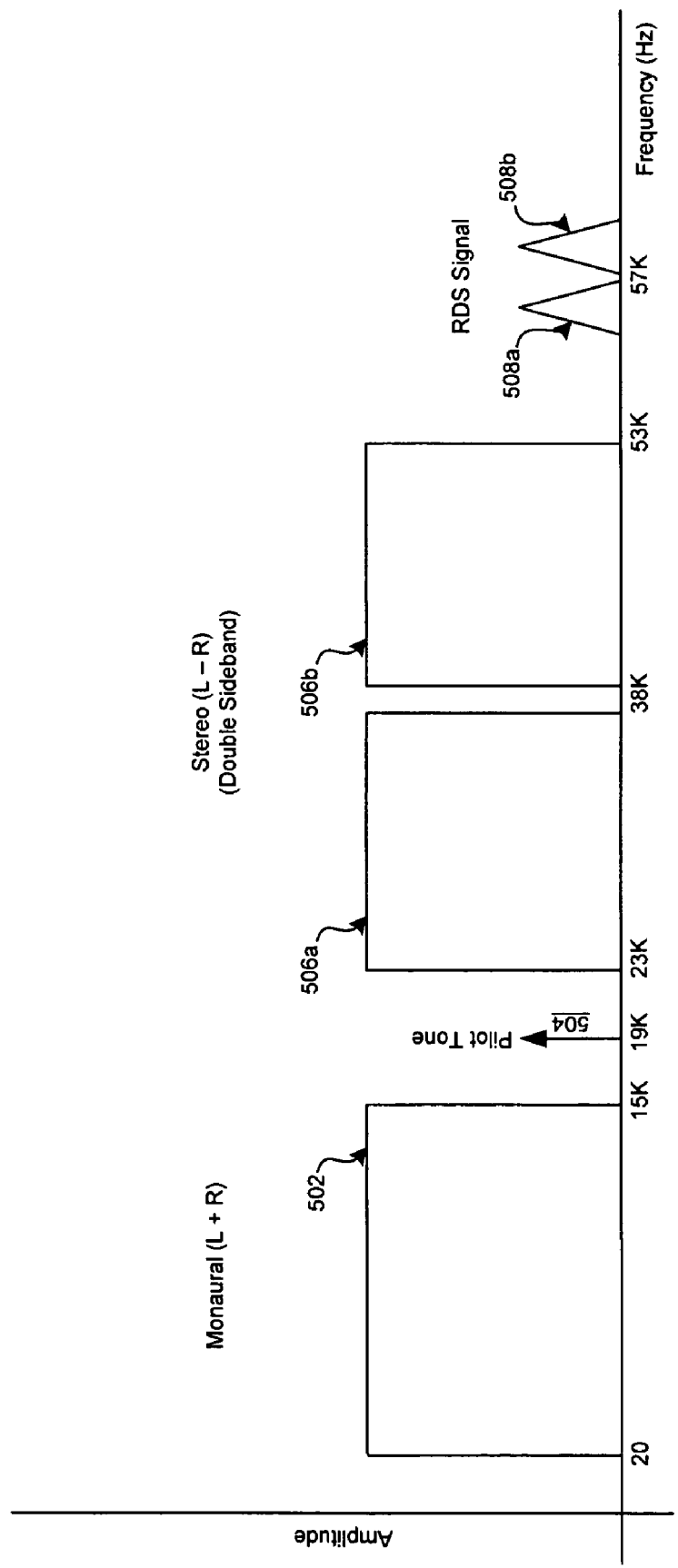
FIG. 5 is an exemplary demodulated FM signal, in connection with an embodiment of the invention.

FIG. 5 is an exemplary demodulated FM signal, in connection with an embodiment of the invention. Referring to FIG. 5, there is shown a monaural audio signal 502, a pilot tone 504, stereo audio signal comprising a lower sideband 506a, and an upper sideband 506b, and an RDS signal comprising a lower sideband 508a, and an upper sideband 508b. The exemplary demodulated FM signal may comprise an AM signal as indicated by the reference number "1" in FIG. 4.

The monaural audio signal 502 may comprise a sum (L+R) of amplitudes of signals from a left (L) stereo channel and a right (R) stereo channel. The monaural signal 502 may enable non-stereo FM receivers to receive audio information from an FM signal. The monaural audio signal 502 may comprise a baseband signal. The frequency range of the baseband signal may comprise approximately 20 Hz to approximately 15 kHz. The baseband signal may comprise a frequency range, which is audible to a human of average hearing ability. The pilot tone 504 may indicate that the demodulated FM signal comprises stereo audio information. The pilot tone 504 may be located at a frequency of approximately 19 kHz.

The stereo audio signal may comprise a difference (L−R) of amplitudes between signals from the L stereo channel and the R stereo channel. The stereo audio signal may be amplitude modulated by a stereo subcarrier signal. The frequency of the stereo subcarrier signal may be equal to about 38 kHz, or that of a second harmonic of the frequency of the pilot signal 504. The result may be a double sideband signal comprising a lower sideband 506a, and an upper sideband 506b. The lower sideband 506a may comprise a range of frequencies, from about 23 kHz to about 38 kHz, that are not greater than the frequency of the stereo subcarrier signal. The upper sideband 506b may comprise a range of frequencies, from about 38 kHz to about 53 kHz, that are not less than the frequency of the stereo subcarrier signal.

The RDS signal may comprise data. The RDS signal may be modulated by an RDS subcarrier signal. The frequency of the RDS subcarrier signal may be equal to about 57 kHz, or that of a third harmonic of the frequency of the pilot signal 504. The result may be a double sideband signal comprising a lower sideband 508a, and an upper sideband 508b. The lower sideband 508a may comprise a range of frequencies, from about 55.6 kHz to about 56.8 kHz, that are not greater than the frequency of the RDS subcarrier signal. The upper sideband 508b may comprise a range of frequencies, from about 57.2 kHz to about 58.4 kHz, that are not less than the frequency of the stereo subcarrier signal.

In operation, the monaural signal 502, stereo lower sideband signal 506a, and stereo upper sideband signal 506b may comprise a substantial portion of the total radiated energy in a transmitted FM signal. Consequently, the amplitudes of the monaural signal 502, stereo lower sideband signal 506a, and stereo upper sideband signal 506b may be greater than the corresponding amplitudes of the pilot tone 504, the RDS lower sideband signal 508a, and the RDS upper sideband signal 508b.

Figure 6:
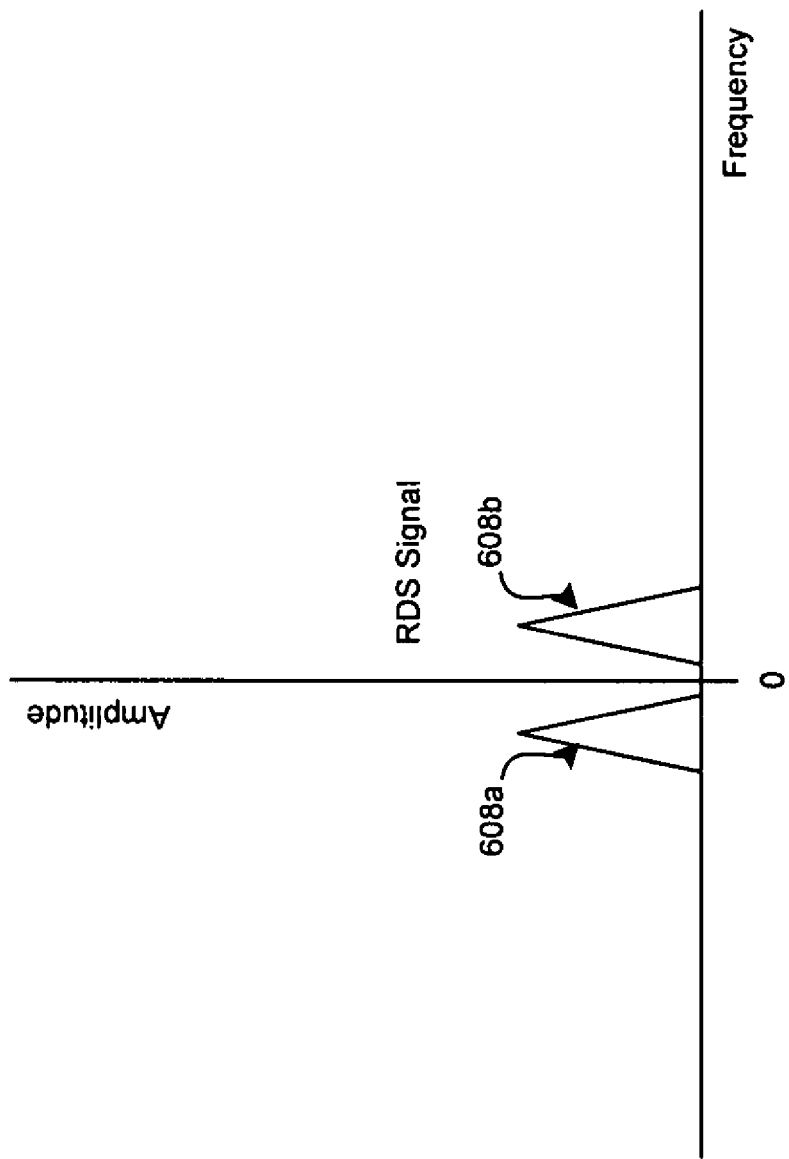
FIG. 6 is an exemplary demodulated RDS signal, in connection with an embodiment of the invention.

FIG. 6 is an exemplary demodulated RDS signal, in connection with an embodiment of the invention. Referring to FIG. 6, there is shown an RDS signal comprising a lower sideband signal 608a, and an upper sideband signal 608b. The exemplary demodulated RDS signal may represent a complex signal as described in equation[1], and indicated by the reference number "2" in FIG. 4.

The MPX decoder 402 may enable demodulation of the RDS lower sideband signal 508a and upper sideband signal 508b from the RDS subcarrier to generate a baseband signal comprising the lower sideband signal 608a, and the upper sideband signal 608b. The bandwidth of the lower sideband signal 608a, and the upper sideband signal 608b may be substantially as described for the lower sideband signal 508a, and the upper sideband signal 508b.

In operation an autofahrer rundfunk information (ARI) signal may also be modulated on the 57 kHz subcarrier frequency. ARI is a radio message broadcasting system that is utilized in Germany. ARI is utilized to broadcast road status and/or travel information via radio. The ARI signal may comprise a lower sideband signal, which comprises a range of frequencies that are substantially higher than the corresponding frequencies of the RDS lower sideband signal 508a. The ARI signal may comprise an upper sideband signal, which comprises a range of frequencies that are substantially lower than the corresponding frequencies of the RDS upper sideband signal 508b. At least a portion of ARI information contained in a demodulated RDS signal may be removed by high pass filtering the RDS signal. For example, the high pass filter 408 may be configured to filter out signal frequencies below about 200 Hz in the baseband RDS signal.

Figure 7A:
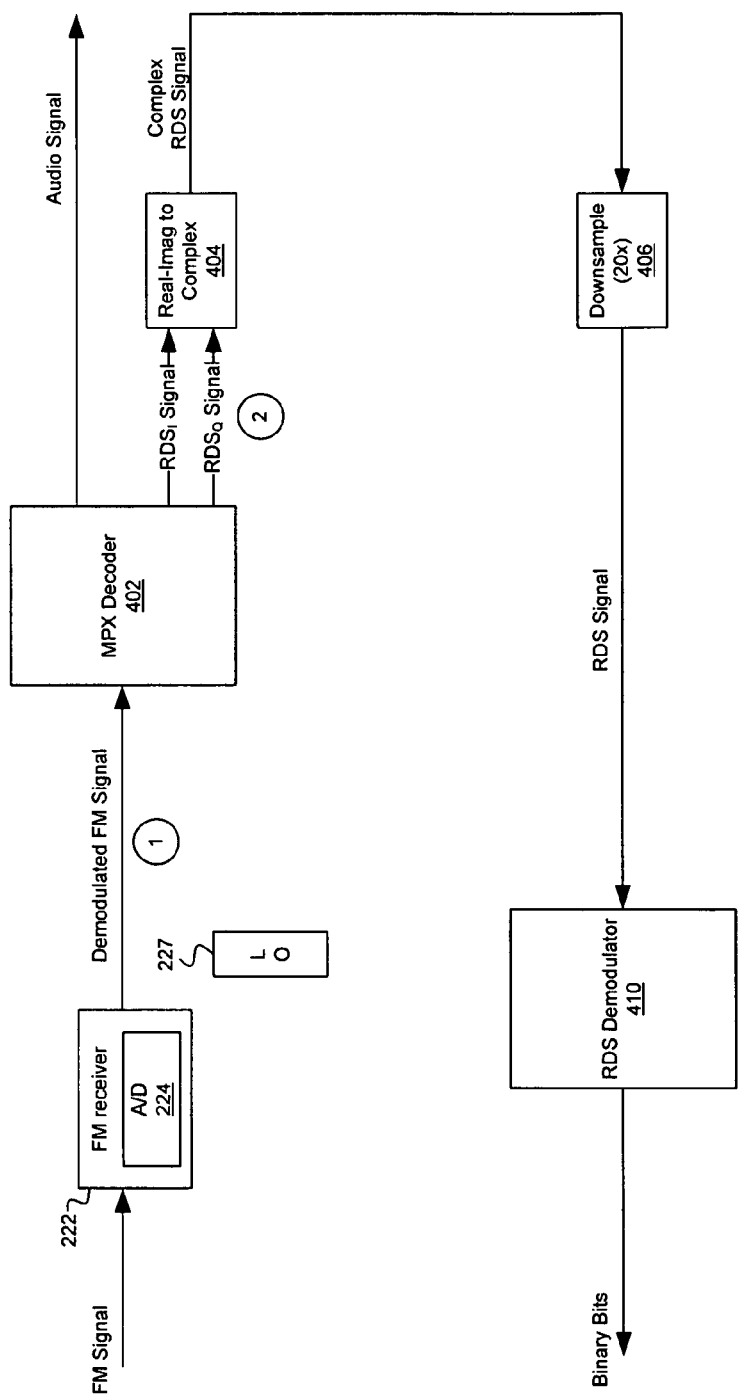
FIG. 7A is a block diagram of an exemplary system for RDS subcarrier demodulation in a single chip integrated Bluetooth and FM transceiver, in accordance with an embodiment of the invention.

FIG. 7A is a block diagram of an exemplary system for RDS subcarrier demodulation in a single chip integrated Bluetooth and FM transceiver, in accordance with an embodiment of the invention. Referring to FIG. 7A, there is shown an FM core 208, a multiplex (MPX) decoder 402, a conversion block 404, a downsample converter block 406, a high pass filter block 408, and an RDS demodulator 410. The FM core 208 may comprise an FM receiver 222 and a local oscillator (LO) 227. The FM receiver 222 may comprise an analog to digital converter 224. FIG. 7A represents an embodiment of the invention that differs from the embodiment illustrated in FIG. 4 in that the embodiment illustrated in FIG. 7A may not utilize the high pass filter 408. In the embodiment of the invention as illustrated in FIG. 7A, the RDS demodulator 410 may be utilized to perform the function of the high pass filter 408.

Figure 7B:
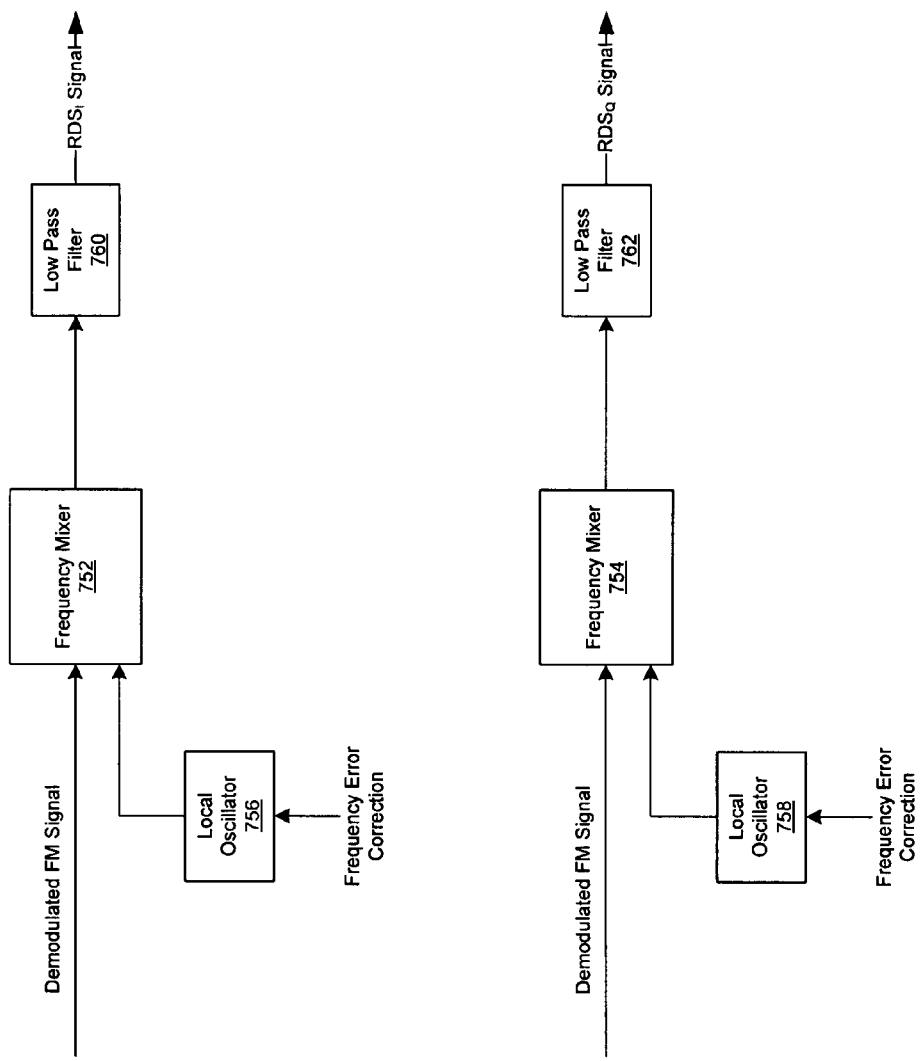
FIG. 7B is a block diagram of an exemplary system for RDS subcarrier demodulation with frequency correction, in accordance with an embodiment of the invention.

FIG. 7B is a block diagram of an exemplary system for RDS subcarrier demodulation with frequency correction, in accordance with an embodiment of the invention. FIG. 7B may represent a portion of the MPX decoder 402. Referring to FIG. 7B, there is shown frequency mixers 752 and 754, local oscillators 756 and 758, and low pass filters 760 and 762. The frequency mixer 752 may comprise suitable circuitry, logic, and/or code that may enable generation of a demodulated RDS signal. The frequency mixer 752 may utilize a demodulation frequency to generate the demodulated RDS signal. The demodulation frequency may be approximately 57 kHz, for example. The demodulation frequency may be generated based on a system clock, for example. In various embodiments of the invention, the frequency associated with the system clock may vary. Uncorrected variations in the system clock may produce frequency errors in the demodulation frequency. The frequency error correction input to the local oscillator 752 may enable the local oscillator 752 to correct errors that may otherwise be produced in the demodulation frequency based on variations in the system clock. The frequency error correction input may enable the local oscillator 752 to adjust the demodulation frequency in response to wide variations, for example between −5% to +5%, in the frequency associated with the system clock. The value of the frequency error correction input may be configurable. The low pass filter 760 may select the RDS signal from the demodulated FM signal. The frequency mixer 754 may be substantially as described for the frequency mixer 752. The local oscillator 758 may be substantially as described for the local oscillator 756. The low pass filter 762 may be substantially as described for the low pass filter 760.

Figure 8:
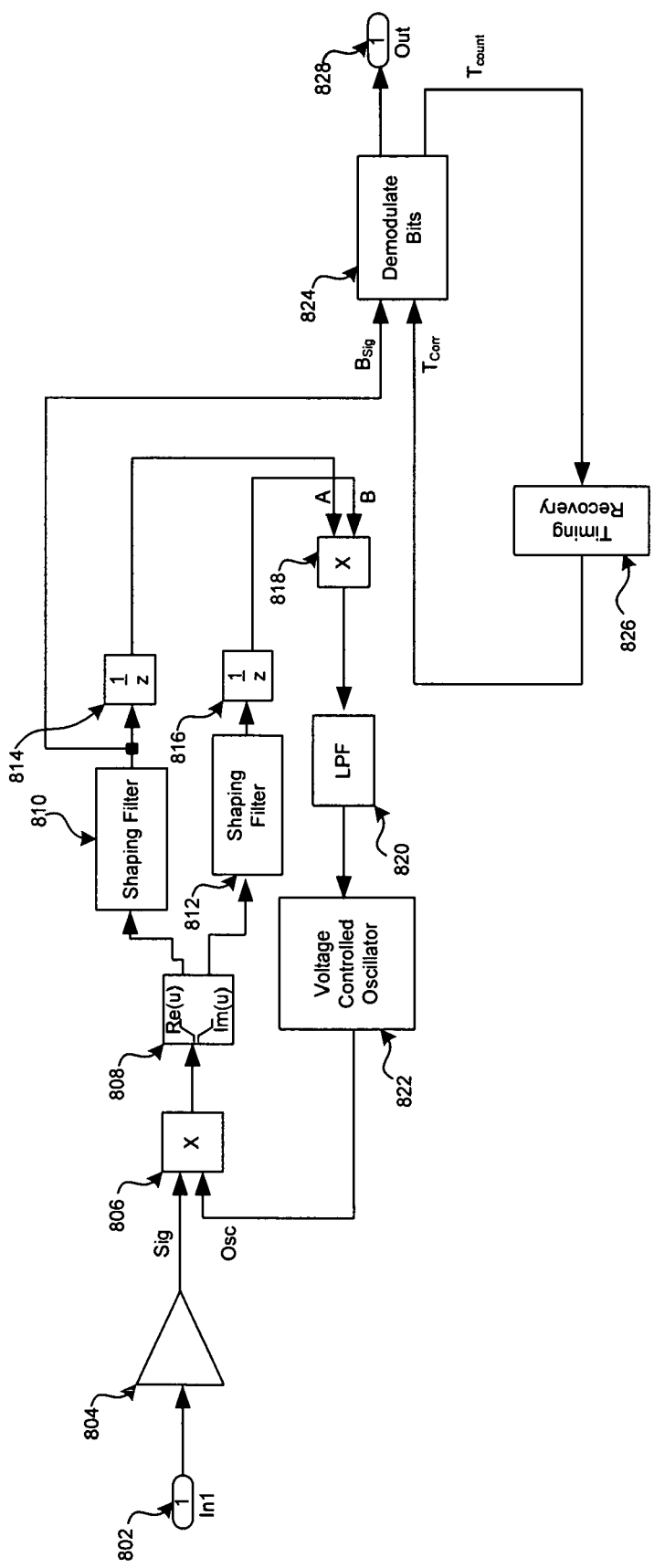
FIG. 8 is a block diagram of an exemplary RDS demodulator, in accordance with an embodiment of the invention.

FIG. 8 is a block diagram of an exemplary RDS demodulator, in accordance with an embodiment of the invention. The RDS demodulator as represented in FIG. 8 may comprise various embodiments of the RDS demodulator 410. Referring to FIG. 8, there is shown an input node 802, an amplifier 804, a frequency mixer 806, a conversion block 808, shaping filter blocks 810 and 812, unit delay blocks 814 and 816, signal multiplier 818, low pass filter 820, voltage controlled oscillator (VCO) 822, demodulate bits block 824, timing recovery block 826, and an output node 828. The input node 802 may represent a received RDS signal. The amplifier 804 may comprise suitable circuitry, logic, and/or code that may enable increasing the amplitude of a received signal.

The frequency mixer 806 may comprise suitable circuitry, logic, and/or code that may enable frequency correction of a received signal. The frequency mixer 806 may receive an input signal, sig, and a frequency offset correction signal, osc. The frequency associated with the signal osc may be represented as $f_{osc}$. The frequency associated with at least a portion of the signal, sig, may be represented as $f_{sig}$. The frequency mixer 806 may enable generation of a frequency corrected version of the signal sig by frequency mixing the signal sig and the frequency offset correction signal, osc. The frequency associated with at least a portion of the frequency corrected signal sig may be represented as $f_{sig}-f_{osc}$.

The conversion block 808 is substantially as described for the conversion block 404.

The shaping filter 810 may comprise suitable circuitry, logic, and/or code that may be utilized to limit the range of frequencies associated with an input signal. In this aspect, the shaping filter may reduce, or narrow, the bandwidth associated with an input signal. In one embodiment of the invention, the shaping filter 810 may implement a low pass filter. The low pass filter may be characterized by a pass frequency $f_{high}$. The low pass filter may allow amplitudes of signal components associated with the input signal to pass from input to output substantially unattenuated when the corresponding frequency associated with the signal component is less than the pass frequency $f_{high}$. The low pass filter may substantially attenuate the amplitudes of signal components when the corresponding frequency associated with the signal component is not less than the pass frequency $f_{high}$. In various embodiments of the invention that utilize a low pass filter, the shaping filter 810 may implement a raised cosine filter, a root raised cosine filter, or a Gaussian filter, for example.

In another embodiment of the invention, the shaping filter 810 may implement a bandpass filter. The bandpass filter may be characterized by a low pass frequency, $f_{low}$, and a high pass frequency $f_{high}$. The bandpass filter may allow amplitudes of signal components associated with the input signal to pass from input to output substantially unattenuated when the corresponding frequency associated with the signal component is less than the high pass frequency $f_{high}$, but not less than the low pass frequency $f_{low}$. The bandpass filter may substantially attenuate the amplitudes of signal components when the corresponding frequency associated with the signal component is not less than the high pass frequency $f_{high}$, or is less than the low pass frequency $f_{low}$.

In various embodiments of the invention that utilize a bandpass filter, the shaping filter 810 may implement a doublet filter. In one embodiment of the invention, a doublet filter may comprise a first derivative of a Gaussian filter profile in either the time or frequency domain. Various embodiments of the invention may not be limited to utilizing a doublet filter. Various embodiments of the invention may not be limited to implementing a doublet filter that is derived from a Gaussian filter profile. Various embodiments of the invention may utilize a filter profile that may be derived from at least a first derivative of a Gaussian filter profile in either the time or frequency domain, for example. This may comprise a filter profile that may be derived from a second derivative of a Gaussian filter profile, a third derivative of a Gaussian filter profile, and so forth. The shaping filter 812 may be substantially as described for the shaping filter 810.

The unit delay block 814 may comprise suitable circuitry, logic, and/or code that may be utilized to generate a time delayed version of an input signal. In various embodiments of the invention, the unit delay block 814 may implement a one clock cycle delay between the input and output. The length of the clock cycle, in terms of units of time, may depend upon the clock rate at which the unit delay block 814 operates. For example, if the clock rate is represented by the variable $R_{clock}$, then the corresponding time length of the unit delay may be represented as $1/R_{clock}$. The unit delay block 816 may be substantially as described for the unit delay block 814.

The signal multiplier 818 may comprise suitable circuitry, logic, and/or code that may enable generation of a signal whose amplitude, at a current time instant, is based on the multiplicative product to the corresponding amplitudes of the input signals at approximately the current time instant. The signal multiplier 818 may receive an input signal, A, and an input signal, B. The input signal A may correspond to a real signal component in a representation of a complex signal. The input signal B may correspond to an imaginary signal component in a representation of the complex signal. The signal multiplier 818 may multiply the value of the amplitude of the input signal A at a given time instant, and the value of the amplitude of the input signal B at approximately the given time instant, to compute a product. The signal multiplier 818 may enable generation of a signal at approximately the given time instant for which the value of the amplitude is approximately equal to the product. The signal generated by the signal multiplier 818 may comprise a correction product signal.

The low pass filter 820 may comprise suitable circuitry, logic, and/or code that may be utilized to compute a signal whose amplitude is based on an averaging of the values of the amplitude of an input signal at time instants spanning the duration of a time interval. The low pass filter 820 may receive an input signal at various time instants during the time interval. The low pass filter 820 may compute a value based on an average value of the amplitudes of the input signal received during the time interval. For a time interval of duration $T_{dur}$, and for a current time instant $t_i$, the time interval may comprise amplitudes of the input signal received at time instants between the time instant $t_i - T_{dur}$, and the current time instant $t_i$. The low pass filter 820 may generate an output signal, at approximately the current time instant, whose amplitude is about equal to the value computed by the low pass filter 820. The signal generated by the low pass filter may comprise an error signal.

The VCO 822 may comprise suitable circuitry, logic, and/or code that may enable generation of an oscillator signal. The frequency of the oscillator signal may be based on the voltage amplitude associated with a received input signal. The frequency of the oscillator signal generated by the VCO 822 may increase with increasing voltage amplitude associated with the received input signal. The frequency of the oscillator signal generated by the VCO 822 may decrease with decreasing voltage amplitude associated with the received input signal. The oscillator signal generated by the VCO 822 may comprise a frequency offset correction signal.

The demodulate bits block 824 may comprise suitable circuitry, logic, and/or code that may enable detection of binary bits in a received signal. The demodulate bits block 824 may receive a signal containing binary information, $B_{Sig}$, and a timing correction signal $T_{Cor}$. The binary information signal $B_{Sig}$ may comprise binary bits that are encoded based on biphase coding, for example. The demodulate bits block 824, may sample the amplitude of the signal $B_{Sig}$ at various time instants. Based on the sampled amplitudes, the demodulate bits block 824 may indicate whether a current binary bit corresponds to a binary value of 0, or a binary value of 1. In various embodiments of the invention that may utilize biphase coding, the demodulate bits block 824 may the binary value of a current binary bit based on two most recent samples of the amplitude of the signal $B_{Sig}$, for example. When the first of the binary samples corresponds to a high positive amplitude while the second corresponds to a high negative amplitude, the corresponding binary value may be 1. When the first of the binary samples corresponds to a high negative amplitude while the second corresponds to a high positive amplitude, the corresponding binary value may be 0. The demodulate bits block 824 may generate output binary values to the output node 828.

The demodulate bits block 824 may determine specific time instants at which the signal $B_{Sig}$ may be sampled. The demodulate bits block 824 may utilize a current value of the timing correction signal $T_{Cor}$ to determine a time instant at which to sample the signal $B_{Sig}$. The demodulate bits block may maintain a counter that indicates a time instant corresponding to at least one most recent sample of the signal $B_{Sig}$. The information based on the value of the counter may be output by the demodulate bits block 824 as the signal $T_{count}$.

The demodulate bits block 824 may also enable adjustment of the time instant at which to sample the signal $B_{Sig}$ based on at least one most recent sampled amplitude of the signal $B_{Sig}$. The demodulate bits block 824 may indicate a specific value that corresponds to a high positive amplitude and/or a high negative amplitude. The demodulate bits block 824 may indicate a threshold value that represents a sampled amplitude in the signal $B_{Sig}$ that may be too low. If the sampled amplitude is determined to be too low, the demodulate bits block 824 may enable adjustment of a time instant at which to sample the signal $B_{Sig}$.

The timing recovery block 826 may comprise suitable circuitry, logic, and/or code that may enable generation of a timing correction signal based on a received input signal. The timing recovery block 826 may receive an input signal $T_{count}$. The input signal may comprise information that indicates a counter value. The timing recover block 826 may maintain an internal counter. The timing correction block 826 may compare the value of its internal counter to a counter value determined from the input signal $T_{count}$. The timing recovery block 826 may enable generation of a timing correction signal, $T_{Cor}$, based on a difference between the value of the internal counter and the counter value determined from the input signal $T_{count}$.

In operation, the input node 802 may receive an RDS signal. The RDS signal may be received as a plurality of signal amplitudes at different time instants. The time interval between receipt of consecutive signal amplitudes may be based on a downsampled rate. The downsampled rate may be based on a system clock and derived by the downsample block 406. The RDS signal may comprise a complex representation as defined in equation[1]. When the shaping filter 810 and/or 812 implements a raised cosine filter, a root raised cosine filter, or a Gaussian filter, for example, the RDS signal may be high pass filtered by the high pass filter 408 as illustrated in FIG. 4. The amplifier 804 may increase the amplitude of the received RDS signal.

The frequency of the received RDS signal may represent a baseband RDS signal derived subsequent to RDS subcarrier demodulation derived by the MPX decoder 402. In many instances, the signal derived by the MPX decoder 402 may comprise frequency errors such that the demodulated RDS signal is not a baseband signal but may comprise low frequency non-baseband components. The frequency mixer 806 may frequency mix the received RDS signal and a frequency offset correction signal generated by the VCO 822. The output from the frequency mixer 806 may comprise a frequency corrected RDS signal.

The shaping filter 810 may generate a filtered RDS signal by filtering the real component of the frequency corrected RDS signal. The shaping filter 812 may filter the imaginary component of the frequency corrected RDS signal. In one embodiment of the invention, the shaping filter 810 may filter the RDS signal utilizing a raised cosine filter. The raised cosine filter may substantially remove frequency components at frequencies above about 2.5 kHz, for example. In another embodiment of the invention, the shaping filter may filter the RDS signal utilizing a doublet filter. The doublet filter may substantially remove frequency components above about 2.5 kHz, or below about 0.2 kHz, or about equal to the bandwidth of an ARI signal, for example.

The filtered real component may be sampled by the demodulate bits block 824 to detect the binary values of binary bits contained in the RDS signal. In various embodiments of the invention, a nonzero value of the imaginary component may represent an error component. The signal multiplier 818 may multiply the amplitudes of the real and imaginary parts at various time instants to generate a correction product signal. The correction product signal may be low pass filtered by the low pass filter block 820. The low pass filter block 820 may compute average values of amplitudes of the correction product signal. The computed average values may correspond to an error signal. The amplitudes of the error signal at various time instants may be utilized by the VCO 822 to generate a frequency offset correction signal.

The demodulate bits block 824 may utilize a counter value to determine a time instant at which to sample the filtered real part. The counter value, cnt_824, may increment at a rate corresponding to the rate at which binary bits are output by the demodulate bits block 824. When utilizing biphase coding, for example, the demodulate bits block may enable sampling of the filtered real part at a rate about twice the rate at which binary bits are output. The rate at which the counter value may increment may be based on the system clock and the downsampled rate determined by the downsample block 406. The downsampled rate may be approximately equal to $20/T_{samp}$, where the time interval $T_{samp}$ may be based on the system clock. The demodulate bits block 824 may communicate information based on the counter value to the timing recovery block 826.

The timing recovery block 826 may maintain an internal counter value, cnt_826. The rate at which the timing recovery block 826 internal counter value may increment may be based on the frequency of the pilot tone 504. The timing recovery block may enable generation of a timing correction signal based on a difference between the counter value cnt_826, and the counter value cnt_824. The timing correction signal may be communicated to the demodulate bits block 824. The demodulate bits block 824 may utilize the timing correction signal to determine a subsequent time instant at which to sample the filtered real part.

Figure 9:
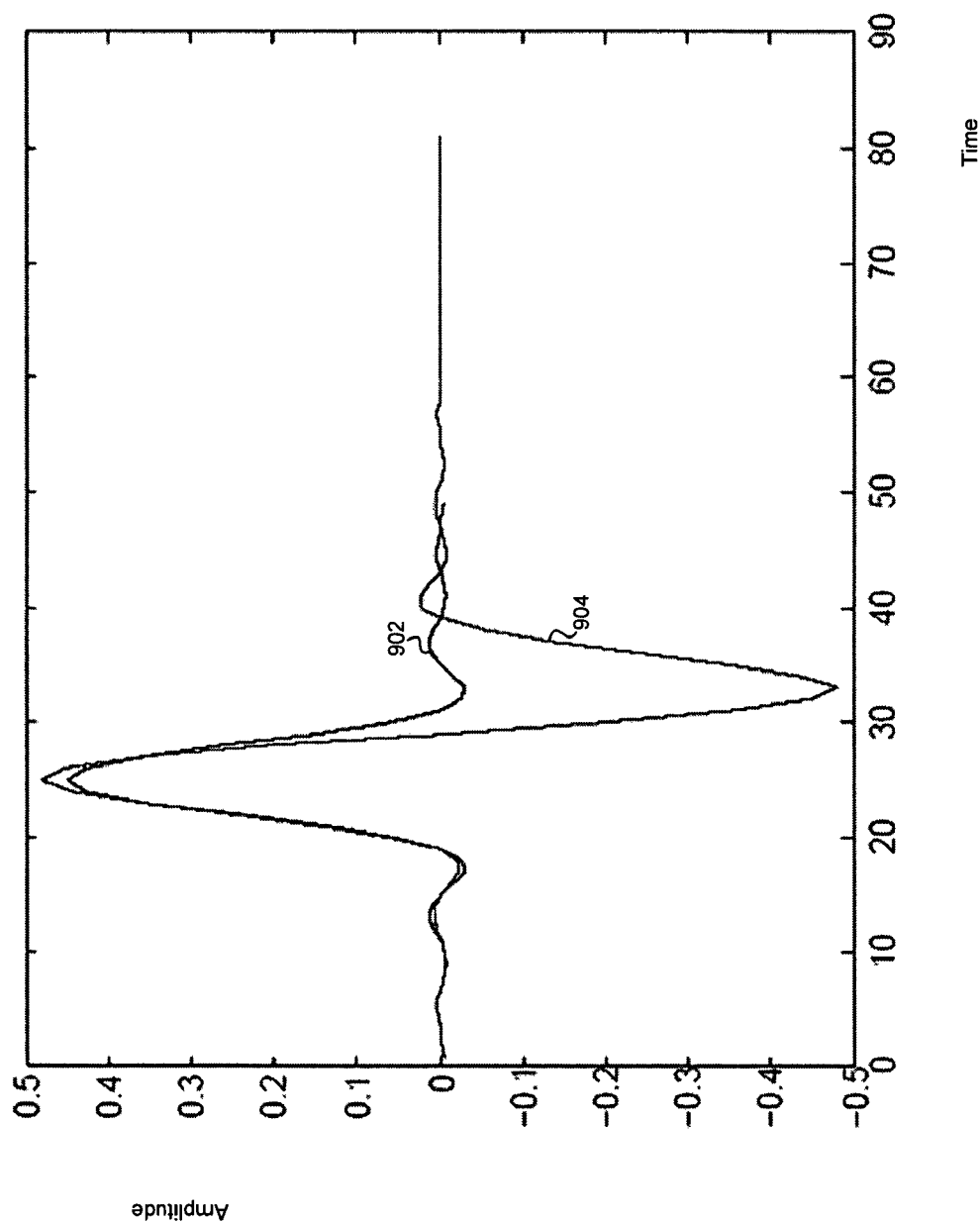
FIG. 9 is a diagram illustrating exemplary raised cosine and doublet filter profiles in the time domain, in connection with an embodiment of the invention.

FIG. 9 is a diagram illustrating exemplary raised cosine and doublet filter profiles in the time domain, in connection with an embodiment of the invention. Referring to FIG. 9, there is shown a raised cosine filter profile 902, and a doublet filter profile 904. The FIG. 9 illustrates amplitude response for the corresponding filters in the time domain.

Figure 10:
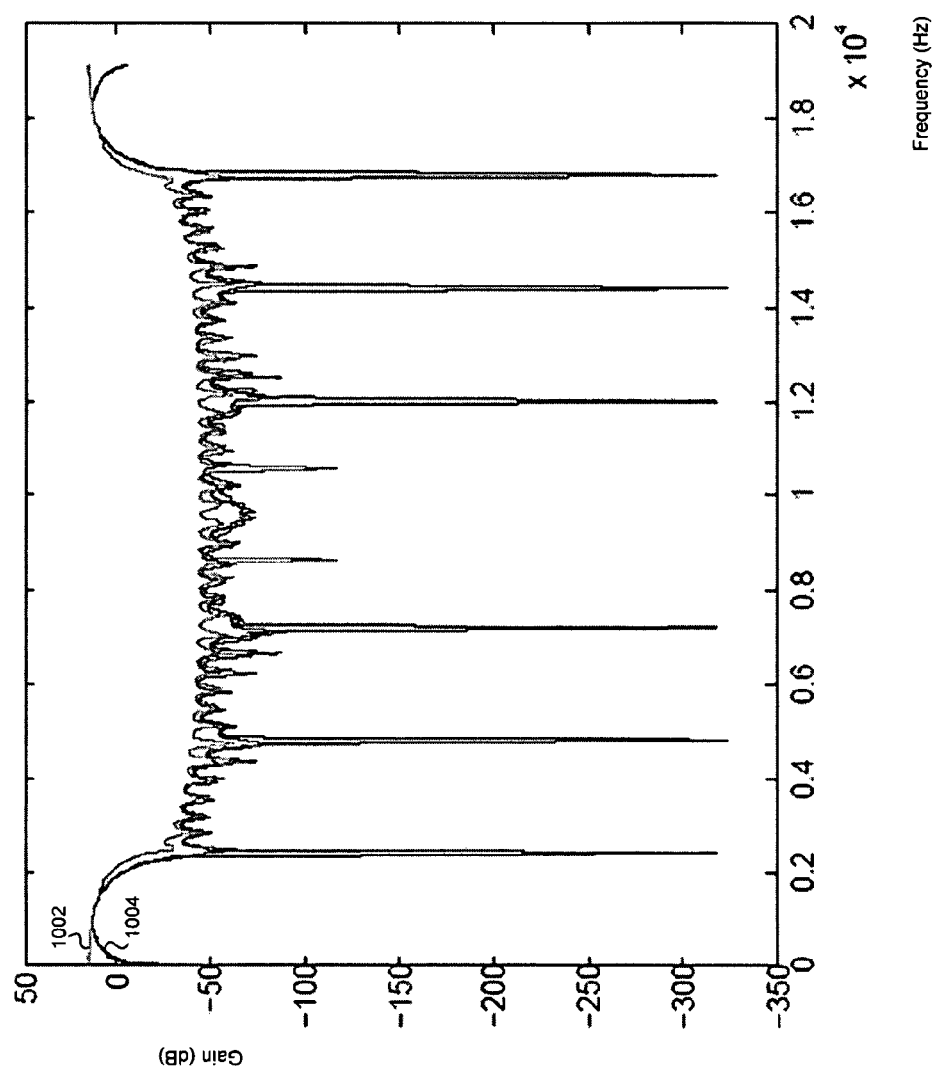
FIG. 10 is a diagram illustrating exemplary raised cosine and doublet filter profiles in the frequency domain, in connection with an embodiment of the invention.

FIG. 10 is a diagram illustrating exemplary raised cosine and doublet filter profiles in the frequency domain, in connection with an embodiment of the invention. Referring to FIG. 10, there is shown a raised cosine filter profile 1002, and a doublet filter profile 1004. The FIG. 10 illustrates amplitude response in decibels (dB) for the corresponding filters in the frequency domain. The raised cosine filter profile 1002 may indicate a low pass filter profile wherein the pass frequency is about 2.5 kHz. The doublet filter profile may indicate a bandpass filter profile wherein the low frequency in the passband is about 0.2 kHz, and the high frequency in the passband is about 2.5 kHz.

Figure 11:
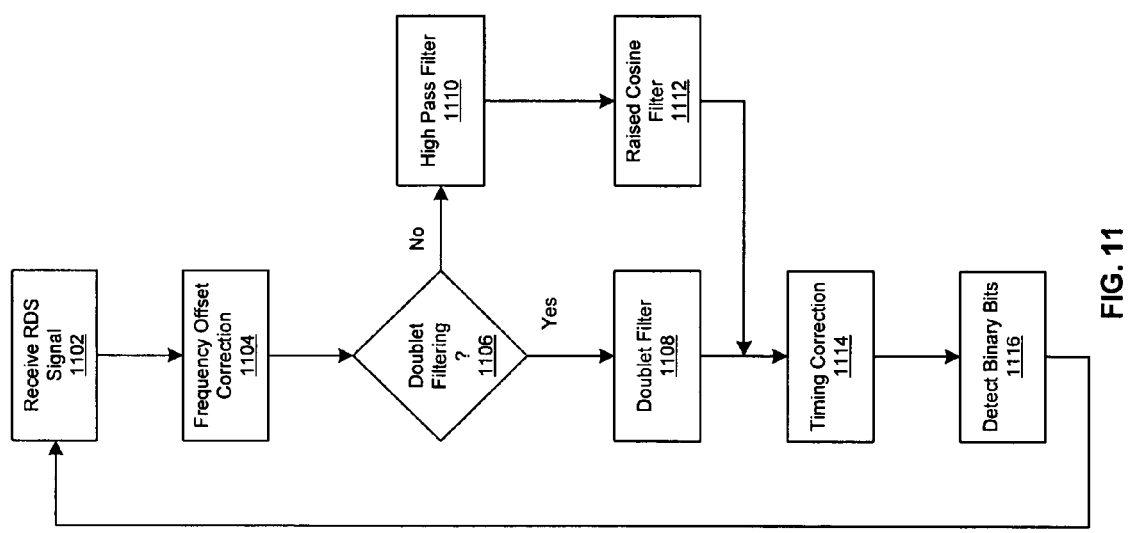
FIG. 11 is a flowchart illustrating exemplary steps in a system for RDS signal demodulation, in accordance with an embodiment of the invention.

FIG. 11 is a flowchart illustrating exemplary steps in a system for RDS signal demodulation, in accordance with an embodiment of the invention. Referring to FIG. 11, in step 1102 an RDS signal may be received. In step 1104, frequency offset correction may be performed on the received RDS signal. Step 1106 may determine whether the shaping filter implements doublet filtering. If doublet filtering is implemented, in step 1108 the RDS signal may be doublet filtered. If step 1106 determines that doublet filtering is not utilized, it may indicate that in step 1110 that the RDS signal received in step 1102 is high pass filtered. In step 1112, the RDS signal may be raised cosine filtered.

Following step 1108 or step 1112, a timing correction may be computed to determine when to sample the RDS signal. In step 1116, binary bits may be detected based on the sampled RDS signal. Step 1102 may follow step 1116.

Aspects of a system for radio data service (RDS) signal demodulation in a single chip integrated Bluetooth and FM transceiver may include circuitry on a single chip that enables demodulation of an RDS signal, filtering of the RDS signal, and detection of binary bits in the filtered RDS signal. The filtered RDS signal may be generated by filtering the RDS signal based on a raised cosine filter, a Gaussian filter, or a doublet filter. In general, the RDS signal may be filtered by a first, or greater, derivative of the Gaussian filter in either the time or frequency domain. The RDS signal may be high pass filtered if the filtered RDS signal is generated by filtering the RDS signal utilizing a raised cosine filter. The circuitry may enable generation of a frequency corrected RDS signal by frequency mixing the RDS signal, and a frequency offset correction signal. The frequency corrected RDS signal may include a real part, and an imaginary part.

The circuitry may enable generation of the filtered RDS signal by filtering a real part of a frequency corrected RDS signal, and an imaginary part of the frequency corrected RDS signal. The filtering of the real part and the imaginary part may utilize a raised cosine filter, a Gaussian filter, a doublet filter, or a filter derived by computing at least a first derivative of the Gaussian filter in the time or frequency domain. A correction product signal may be computed at a current time instant by multiplying a time delayed filtered version of the real part, and a time delayed filtered version of the imaginary part. The circuitry may enable generation of an error signal based on low pass filtering the correction product signal. A frequency offset correction signal may be generated based on the error signal.

The circuitry may enable detection of a current binary bit by sampling at least one value of a real part of the filtered RDS signal during a current sampling time interval. A subsequent binary bit may be detected by sampling the real part during a subsequent sampling time interval. The subsequent sampling time interval may be based on the current sampling time interval and/or at least one value of the real part during the current sampling time interval.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:
    performing by one or more processors and/or circuits:
    demodulating a radio data service (RDS) signal;
    filtering said RDS signal;
    detecting binary bits in said filtered RDS signal, wherein said filtered RDS signal is generated by filtering said RDS signal based on one or more of:
        a raised cosine filter coupled to a high pass filter;
        a Gaussian filter coupled to a high pass filter;
        a doublet filter; and
        a filter comprising at least a first derivative of said Gaussian filter in one or both of a time domain and a frequency domain;
    generating said filtered RDS signal by filtering one or both of a real part of a frequency corrected RDS signal and an imaginary part of said frequency corrected RDS signal, utilizing one or more of said raised cosine filter, said Gaussian filter, said doublet filter, and said at least a first derivative of said Gaussian filter;
    computing a correction product signal at a current time instant based on multiplication of a time delayed filtered version of said real part and a time delayed filtered version of said imaginary part; and
    generating an error signal based on low pass filtering said correction product signal.

2. The method according to claim 1, comprising generating a frequency corrected RDS signal by frequency mixing said RDS signal and a frequency offset correction signal.

3. The method according to claim 1, comprising demodulating said RDS signal based on a configurable value associated with a frequency error correction input.

4. The method according to claim 1, comprising generating a frequency offset correction signal based on said error signal.

5. A method for providing wireless communication, the method comprising:
    performing by one or more processors and/or circuits:
        demodulating a radio data service (RDS) signal;
        filtering said RDS signal;
        detecting binary bits in said filtered RDS signal, wherein said filtered RDS signal is generated by filtering said RDS signal based on one or more of:
            a raised cosine filter coupled to a high pass filter;
            a Gaussian filter coupled to a high pass filter;
            a doublet filter; and
            a filter comprising at least a first derivative of said Gaussian filter in one or both of a time domain and a frequency domain;
        detecting a current binary bit by sampling at least one value of a real part of said filtered RDS signal during a current sampling time interval; and
        detecting a subsequent binary bit by sampling said real part during a subsequent sampling time interval, wherein said subsequent sampling time interval is based on one or both of said current sampling time interval and said at least one value of said real part during said current sampling time interval.

6. The method according to claim 5, comprising generating a frequency corrected RDS signal by frequency mixing said RDS signal and a frequency offset correction signal.

7. The method according to claim 5, comprising demodulating said RDS signal based on a configurable value associated with a frequency error correction input.

8. A method for providing wireless communication, the method comprising:
    demodulating a radio data service (RDS) signal;
    filtering said RDS signal;
    detecting binary bits in said filtered RDS signal, wherein said filtered RDS signal is generated by filtering said RDS signal based on one or more of the following:
        a raised cosine filter coupled to a high pass filter;
        a Gaussian filter coupled to a high pass filter;
        a doublet filter; and
        a filter comprising at least a first derivative of said Gaussian filter in one or both of a time domain and a frequency domain;
    detecting a current binary bit by sampling at least one value of a real part of said filtered RDS signal during a current sampling time interval; and
    determining a time for said sampling by comparing a system clock counter value based on a system clock and a signal counter value based on said RDS signal.

9. The method according to claim 8, comprising generating a frequency corrected RDS signal by frequency mixing said RDS signal and a frequency offset correction signal.

10. The method according to claim 8, comprising demodulating said RDS signal based on a configurable value associated with a frequency error correction input.

11. A system for providing wireless communication, the system comprising:
    one or more circuits within a single chip that are operable to demodulate a radio data service (RDS) signal;
    said one or more circuits are operable to filter said RDS signal;
    said one or more circuits are operable to detect binary bits in said filtered RDS signal, wherein said filtered RDS signal is generated by filtering said RDS signal based on one or more of the following:
        a raised cosine filter coupled to a high pass filter;
        a Gaussian filter coupled to a high pass filter;
        a doublet filter; and
        a filter comprising at least a first derivative of said Gaussian filter in one or both of a time domain and a frequency domain;
    said one or more circuits are operable to generate said filtered RDS signal by filtering one or both of a real part of a frequency corrected RDS signal and an imaginary part of said frequency corrected RDS signal, utilizing one or more of said raised cosine filter, said Gaussian filter, said doublet filter, and said at least a first derivative of said Gaussian filter;
    said one or more circuits are operable to compute a correction product signal at a current time instant based on multiplication of a time delayed filtered version of said real part and a time delayed filtered version of said imaginary part; and said one or more circuits are operable to generate an error signal based on low pass filtering said correction product signal.

12. The system according to claim 11, wherein said one or more circuits are operable to generate a frequency corrected RDS signal by frequency mixing said RDS signal and a frequency offset correction signal.

13. The system according to claim 11, wherein said one or more circuits are operable to demodulate said RDS signal based on a configurable value associated with a frequency error correction input.

14. The system according to claim 11, wherein said one or more circuits are operable to generate a frequency offset correction signal based on said error signal.

15. A system for providing wireless communication, the system comprising:

one or more circuits within a single chip that are operable to demodulate a radio data service (RDS) signal;

said one or more circuits are operable to filter said RDS signal;

said one or more circuits are operable to detect binary bits in said filtered RDS signal, wherein said filtered RDS signal is generated by filtering said RDS signal based on one or more of:

a raised cosine filter coupled to a high pass filter;

a Gaussian filter coupled to a high pass filter;

a doublet filter; and a filter comprising at least a first derivative of said Gaussian filter in one or both of a time domain and a frequency domain;

said one or more circuits are operable to detect a current binary bit by sampling at least one value of a real part of said filtered RDS signal during a current sampling time interval; and said one or more circuits are operable to detect a subsequent binary bit by sampling said real part during a subsequent sampling time interval, wherein said subsequent sampling time interval is based on one or both of said current sampling time interval and said at least one value of said real part during said current sampling time interval.

16. The system according to claim 15, wherein said one or more circuits are operable to generate a frequency corrected RDS signal by frequency mixing said RDS signal and a frequency offset correction signal.

17. The system according to claim 15, wherein said one or more circuits are operable to demodulate said RDS signal based on a configurable value associated with a frequency error correction input.

18. A system for providing wireless communication, the system comprising:

one or more circuits within a single chip that are operable to demodulate a radio data service (RDS) signal;

said one or more circuits are operable to filter said RDS signal;

said one or more circuits are operable to detect binary bits in said filtered RDS signal, wherein said filtered RDS signal is generated by filtering said RDS signal based on one or more of the following:

a raised cosine filter coupled to a high pass filter;

a Gaussian filter coupled to a high pass filter;

a doublet filter; and a filter comprising at least a first derivative of said Gaussian filter in one or both of a time domain and a frequency domain;

said one or more circuits are operable to detect a current binary bit by sampling at least one value of a real part of said filtered RDS signal during a current sampling time interval; and said one or more circuits are operable to determine a time for said sampling by comparing a system clock counter value based on a system clock, and a signal counter value based on said RDS signal.

19. The system according to claim 18, wherein said one or more circuits are operable to generate a frequency corrected RDS signal by frequency mixing said RDS signal and a frequency offset correction signal.

20. The system according to claim 18, wherein said one or more circuits are operable to demodulate said RDS signal based on a configurable value associated with a frequency error correction input.

* * * * *